US007003631B2

(12) United States Patent
Rowlands

(10) Patent No.: US 7,003,631 B2
(45) Date of Patent: Feb. 21, 2006

(54) SYSTEM HAVING ADDRESS-BASED INTRANODE COHERENCY AND DATA-BASED INTERNODE COHERENCY

(75) Inventor: Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 404 days.

(21) Appl. No.: 10/270,480

(22) Filed: Oct. 11, 2002

(65) Prior Publication Data

US 2003/0217234 A1    Nov. 20, 2003

Related U.S. Application Data

(60) Provisional application No. 60/380,740, filed on May 15, 2002.

(51) Int. Cl.
*G06F 12/00* (2006.01)
(52) U.S. Cl. .................. 711/141; 711/119; 711/133; 711/142; 711/144; 711/159; 709/217; 707/10; 707/201
(58) Field of Classification Search ................ 711/119, 711/133, 141, 142, 144, 159; 709/217; 707/10, 707/201
See application file for complete search history.

(56) References Cited

U.S. PATENT DOCUMENTS

| 5,644,753 A | 7/1997 | Ebrahim et al. |
| 5,710,907 A | 1/1998 | Hagersten et al. |
| 5,878,268 A | 3/1999 | Hagersten |
| 5,887,138 A | 3/1999 | Hagersten et al. |
| 5,920,226 A | 7/1999 | Mimura |
| 5,925,097 A | 7/1999 | Gopinath et al. |
| 5,961,623 A | 10/1999 | James et al. |
| 5,963,745 A | 10/1999 | Collins et al. |
| 6,009,426 A | 12/1999 | Jouenne et al. |
| 6,070,215 A | 5/2000 | Deschepper et al. |
| 6,085,295 A * | 7/2000 | Ekanadham et al. ........ 711/145 |

(Continued)

FOREIGN PATENT DOCUMENTS

EP        265 636        10/1986

(Continued)

OTHER PUBLICATIONS

Lenoski et al., The Directory-Based Cache Coherence Protocol for the DASH Multiprocessor, May 1990, Proceedings of the 17 Annual International Symposium on Computer Architecture, pp. 148-159.*

(Continued)

*Primary Examiner*—Brian R. Peyton
*Assistant Examiner*—Bao Quoc Truong
(74) *Attorney, Agent, or Firm*—Garlick Harrison & Markison LLP

(57)    ABSTRACT

A system comprises a plurality of nodes, each node comprising one or more coherent agents coupled to an interconnect. Ownership of a coherency block accessed by a transaction on the interconnect is transferred responsive to transmission of the address on the interconnect. The system further includes a second interconnect to which the plurality of nodes are coupled, wherein ownership of a coherency block is transferred on the second interconnect responsive to a transmission of the data comprising the coherency block on the second interconnect. A first node of the plurality of nodes issues a coherency command on the second interconnect to fetch the coherency block in response to the transaction on the interconnect within the first node, whereby ownership transfers within the first node prior to ownership transferring from another one of the plurality of nodes to the first node.

16 Claims, 17 Drawing Sheets

U.S. PATENT DOCUMENTS

| | | | |
|---|---|---|---|
| 6,094,715 | A | 7/2000 | Wilkinson et al. |
| 6,101,420 | A | 8/2000 | Van Doren et al. |
| 6,105,119 | A | 8/2000 | Kerr et al. |
| 6,108,739 | A | 8/2000 | James et al. |
| 6,108,752 | A | 8/2000 | Van Doren et al. |
| 6,108,764 | A * | 8/2000 | Baumgartner et al. ........ 712/28 |
| 6,138,217 | A | 10/2000 | Hamaguchi |
| 6,182,201 | B1 | 1/2001 | Arimilli et al. |
| 6,195,739 | B1 | 2/2001 | Wright et al. |
| 6,202,132 | B1 | 3/2001 | Islam et al. |
| 6,209,065 | B1 | 3/2001 | Van Doren et al. |
| 6,219,755 | B1 | 4/2001 | Klein |
| 6,249,846 | B1 | 6/2001 | Van Doren et al. |
| 6,266,731 | B1 | 7/2001 | Riley et al. |
| 6,266,743 | B1 * | 7/2001 | Carpenter et al. .......... 711/143 |
| 6,279,085 | B1 * | 8/2001 | Carpenter et al. .......... 711/143 |
| 6,298,370 | B1 | 10/2001 | Tang et al. |
| 6,338,122 | B1 * | 1/2002 | Baumgartner et al. ...... 711/141 |
| 6,546,429 | B1 * | 4/2003 | Baumgartner et al. ...... 709/253 |
| 6,725,343 | B1 * | 4/2004 | Barroso et al. ............. 711/145 |
| 6,766,360 | B1 * | 7/2004 | Conway et al. ............. 709/214 |
| 2002/0038407 | A1 | 3/2002 | Mounes-Toussi et al. |

FOREIGN PATENT DOCUMENTS

| | | |
|---|---|---|
| EP | 893 766 | 1/1999 |
| EP | 936 555 | 8/1999 |
| EP | 945 805 | 9/1999 |
| EP | 777 179 | 5/2002 |
| EP | 02025691.3 | 4/2003 |
| WO | WO 00/38069 | 6/2000 |

OTHER PUBLICATIONS

Advanced Micro Devices, HyperTransport Technology I/O Link, Jul. 2001, White Paper, pp. 1-25.*

"They Design and Analysis of Dash: A Scalable Directory-Based Multiprocessor," Daniel Lenoski, Dec. 1991, A Dissertation submitted to the Dept. of Elect. Engin. And the committee on graduate studies of Stanford Univ., 176 pages.

"An Argument for Simple COMA," Saulsbury, et al., Aug. 1, 1994, SISC Research Report No. R94:15, 20 pages.

Tom R. Halfhill, "SiByte Reveals 64-Bit Core For NPUs; Independent MIPS64 Design Combines Low Power, High Performance," Microdesign Resources, Jun. 2000, Microprocessor Report, 4 pages.

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB-1 CPU, Oct. 2000, rev.0.1, 1 page.

SiByte, "Fact Sheet," SB-1250, Oct. 2000, rev.0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking, "0 Oct. 10, 2000, 22 pages.

Giorgi et al.; PSCR: A Coherence Protocol for Eliminating Passive Sharing in Shared-Bus Shared-Memory Multiprocessors; IEEE Transactions on Parallel and Distributed Systems; vol. 10, No. 7, Jul. 1999.

* cited by examiner

Interconnect Transactions

| Transaction |
|---|
| RdShd |
| RdExc |
| Wr |
| WrInv |
| RdKill |
| RdInv |
| WrFlush |
| Nop |

— 42

HTcc Commands

| Command | Virtual Channel |
|---|---|
| cRdShd | CRd |
| cRdExc | CRd |
| Flush | Probe |
| Kill | Probe |
| Kill_Ack | Ack |
| WB | Ack |
| Fill | CFill |

| Source | Transaction | RLD State | New RLD State | Set Owner? | Reset Other Owners? |
|---|---|---|---|---|---|
| Local | RdExc | S | I | -- | -- |
| Local | RdExc | M | I | -- | -- |
| Local | RdShd | M | I | -- | -- |
| Remote | RdExc | S | M | yes | yes |
| Remote | RdExc | M | M | yes | yes |
| Remote | RdExc | I | M | yes | n/a |
| Remote | RdShd | S | S | yes | no |
| Remote | RdShd | M | S | yes | yes |
| Remote | RdShd | I | S | yes | n/a |
| Either | WrInv | S or M | I | -- | -- |

Fig. 17

SYSTEM HAVING ADDRESS-BASED INTRANODE COHERENCY AND DATA-BASED INTERNODE COHERENCY

This application claims benefit of priority to U.S. Provisional Patent Application Ser. No. 60/380,740, filed May 15, 2002.

BACKGROUND OF THE INVENTION

1. Field of the Invention

This invention is related to coherent memory systems, including coherent distributed memory systems such as cache-coherent nonuniform memory access (CC-NUMA) memory systems.

2. Description of the Related Art

Memory systems (including main memory and any caches in the system) are often designed to be coherent. That is, even though multiple copies of data from a given memory location may exist in the memory system, a read of that memory location returns the most recent data written to that memory location. Typically, a coherent system may include one or more coherent agents and a memory controller coupled via an interconnect of some kind.

One mechanism for scaling coherent systems to larger numbers of coherent agents is using a distributed memory system. In such a system, memory is distributed among various nodes (which may also include coherent agents), and the nodes are interconnected. A coherent agent in one node may access memory in another node. One class of techniques for maintaining coherency in a distributed memory system is referred to as cache-coherent, nonuniform memory access (CC-NUMA). In a CC-NUMA system, access to memory may have a varying latency (e.g. memory in the same node as an agent may be accessed more rapidly than memory in another node, and accesses to different nodes may have varying latencies as well), but coherency is maintained. A mechanism for implementing CC-NUMA coherency in nodes formed from the coherent systems mentioned above is desired.

SUMMARY OF THE INVENTION

In one embodiment, a system comprises a plurality of nodes, each node comprising one or more coherent agents coupled to an interconnect. Ownership of a coherency block accessed by a transaction on the interconnect is transferred responsive to transmission of the address on the interconnect. The system further includes a second interconnect to which the plurality of nodes are coupled, wherein ownership of a coherency block is transferred on the second interconnect responsive to a transmission of the data comprising the coherency block on the second interconnect. A first node of the plurality of nodes issues a coherency command on the second interconnect to fetch the coherency block in response to the transaction on the interconnect within the first node, whereby ownership transfers within the first node prior to ownership transferring from another one of the plurality of nodes to the first node.

In another implementation, a node comprises one or more coherent agents coupled to a first interconnect, wherein ownership of a coherency block accessed by a transaction on the first interconnect is transferred responsive to transmission of the address on the first interconnect. The node further comprises a node controller coupled to the first interconnect and configured to transmit coherency commands on a second interconnect to other nodes, wherein ownership of a coherency block is transferred on the second interconnect responsive to a transmission of the data comprising the coherency block on the second interconnect. The node controller issues a coherency command on the second interconnect to fetch the coherency block in response to the transaction on the first interconnect, whereby ownership transfers within the node prior to ownership transferring from another node to the node.

BRIEF DESCRIPTION OF THE DRAWINGS

The following detailed description makes reference to the accompanying drawings, which are now briefly described.

FIG. 3 is a table illustrating an exemplary set of coherency commands and a table illustrating an exemplary set of transactions according to one embodiment of the node shown in FIG. 1.

FIG. 17 is a table illustrating exemplary updates of one embodiment of a remote line directory.

Figure 1:
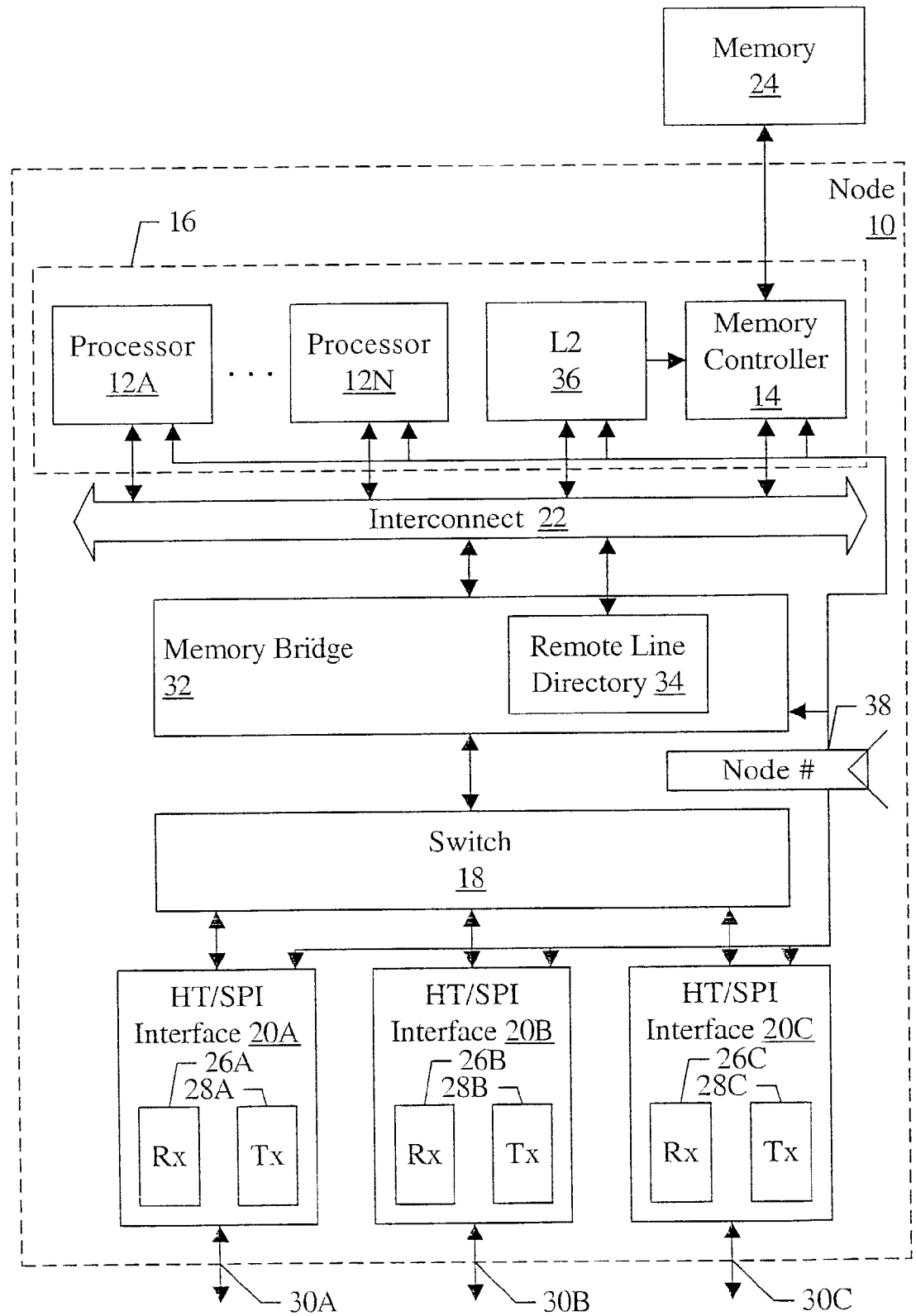
FIG. 1 is a block diagram of one embodiment of a node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Node Overview

Turning now to FIG. 1, a block diagram of one embodiment of a node 10 is shown. In the embodiment of FIG. 1, the node 10 includes one or more processors 12A–12N, a memory controller 14, a switch 18, a set of interface circuits 20A–20C, a memory bridge 32, and an L2 cache 36. The memory bridge 32 includes a remote line directory 34. The node 10 includes an interconnect 22 to which the processors 12A–12N, the memory controller 14, the L2 cache 36, the memory bridge 32, and the remote line directory 34 are coupled. The node 10 is coupled, through the memory controller 14, to a memory 24. The interface circuits 20A–20C each include a receive (Rx) circuit 26A–26C and a transmit (Tx) circuit 28A–28C. The node 10 is coupled to a set of interfaces 30A–30C through respective interface circuits 20A–20C. The interface circuits 20A–20C are coupled to the switch 18, which is further coupled to the memory bridge 32. A configuration register 38 is also illustrated in FIG. 1, which stores a node number (Node #) for the node 10. The configuration register 38 is coupled to the L2 cache 36, the memory controller 14, the memory bridge 32, and the interface circuits 20A–20C in the embodiment of FIG. 1. Additionally, the processors 12A–12N may be coupled to receive the node number from the configuration register 38.

The node 10 may support intranode coherency for transactions on the interconnect 22. Additionally, the node 10 may support internode coherency with other nodes (e.g. a CC-NUMA coherency, in one embodiment). Generally, as used herein, a memory bridge includes circuitry designed to handle internode coherency functions within a node. Particularly, in one embodiment, if a transaction on the interconnect 22 (e.g. a transaction issued by the processors 12A–12N) accesses a cache block that is remote to the node 10 (i.e. the cache block is part of the memory coupled to a different node) and the node 10 does not have sufficient ownership to perform the transaction, the memory bridge 32 may issue one or more coherency commands to the other nodes to obtain the ownership (and a copy of the cache block, in some cases). Similarly, if the transaction access a local cache block but one or more other nodes have a copy of the cache block, the memory bridge 32 may issue coherency commands to other nodes. Still further, the memory bridge 32 may receive coherency commands from other nodes, and may perform transactions on the interconnect 22 to effect the coherency commands.

In one embodiment, a node such as node 10 may have memory coupled thereto (e.g. memory 24). The node may be responsible for tracking the state, in other nodes, of each cache block from the memory in that node. A node is referred to as the "home node" for cache blocks from the memory assigned to that node. A node is referred to as a "remote node" for a cache block if the node is not the home node for that cache block. Similarly, a cache block is referred to as a local cache block in the home node for that cache block and as a remote cache block in other nodes.

Generally, a remote node may begin the coherency process by requesting a copy of a cache block from the home node of that cache block using a coherency command. The memory bridge 32 in the remote node, for example, may detect a transaction on the interconnect 22 that accesses the cache block and may detect that the remote node does not have sufficient ownership of the cache block to complete the transaction (e.g. it may not have a copy of the cache block at all, or may have a shared copy and may require exclusive ownership to complete the transaction). The memory bridge 32 in the remote node may generate and transmit the coherency command to the home node to obtain the copy or to obtain sufficient ownership. The memory bridge 32 in the home node may determine if any state changes in other nodes are to be performed to grant the requested ownership to the remote node, and may transmit coherency commands (e.g. probe commands) to effect the state changes. The memory bridge 32 in each node receiving the probe commands may effect the state changes and respond to the probe commands. Once the responses have been received, the memory bridge 32 in the home node may respond to the remote node (e.g. with a fill command including the cache block).

The remote line directory 34 may be used in the home node to track the state of the local cache blocks in the remote nodes. The remote line directory 34 is updated each time a cache block is transmitted to a remote node, the remote node returns the cache block to the home node, or the cache block is invalidated via probes. As used herein, the "state" of a cache block in a given node refers to an indication of the ownership that the given node has for the cache block according to the coherency protocol implemented by the nodes. Certain levels of ownership may permit no access, read-only access, or read-write access to the cache block. For example, in one embodiment, the modified, shared, and invalid states are supported in the internode coherency protocol. In the modified state, the node may read and write the cache block and the node is responsible for returning the block to the home node if evicted from the node. In the shared state, the node may read the cache block but not write the cache block without transmitting a coherency command to the home node to obtain modified state for the cache block. In the invalid state, the node may not read or write the cache block (i.e. the node does not have a valid copy of the cache block). Other embodiments may use other coherency protocols (e.g. the MESI protocol, which includes the modified, shared, and invalid states and an exclusive state in which the cache block has not yet been updated but the node is permitted to read and write the cache block, or the MOESI protocol which includes the modified, exclusive, shared, and invalid states and an owned state which indicates that there may be shared copies of the block but the copy in main memory is stale). In one embodiment, agents within the node may implement the MESI protocol for intranode coherency. Thus, the node may be viewed as having a state in the internode coherency and individual agents may have a state in the intranode coherency (consistent with the internode coherency state for the node containing the agent).

Coherency commands are transmitted and received on one of the interfaces 30A–30C by the corresponding interface circuit 20A–20C. The interface circuits 20A–20C receive coherency commands for transmission from the memory bridge 32 and transmit coherency commands received from the interfaces 30A–30C to the memory bridge 32 for processing, if the coherency commands require processing in the node 10. In some embodiments, a coherency command may be received that is passing through the node 10 to another node, and does not require processing in the node 10. The interface circuits 20A–20C may be configured to detect such commands and retransmit them (through another interface circuit 20A–20C) without involving the memory bridge 32.

In the illustrated embodiment, the interface circuits 20A–20C are coupled to the memory bridge 32 through the switch 18 (although in other embodiments, the interface circuits 20A–20C may have direct paths to the memory bridge 32). The switch 18 may selectively couple the interface circuits 20A–20C (and particularly the Rx circuits 26A–26C in the illustrated embodiment) to other interface circuits 20A–20C (and particularly the Tx circuits 28A–28C in the illustrated embodiment) or to the memory bridge 32 to transfer received coherency commands. The switch 18 may also selectively couple the memory bridge 32 to the interface circuits 20A–20C (and particularly to the Tx circuits 28A–28C in the illustrated embodiment) to transfer coherency commands generated by the memory bridge 32 from the memory bridge 32 to the interface circuits 20A–20C for transmission on the corresponding interface 30A–30C. The switch 18 may have request/grant interfaces to each of the interface circuits 20A–20C and the memory bridge 32 for requesting transfers and granting those transfers. The switch 18 may have an input path from each source (the Rx circuits 26A–26C and the memory bridge 32) and an output path to each destination (the Tx circuits 28A–28C and the memory bridge 32), and may couple a granted input path to a granted output path for transmission of a coherency command (or a portion thereof, if coherency commands are larger than one transfer through the switch 18). The couplings may then be changed to the next granted input path and granted output path. Multiple independent input path/output path grants may occur concurrently.

In one embodiment, the interfaces 30A–30C may support a set of virtual channels in which commands are transmitted. Each virtual channel is defined to flow independent of the other virtual channels, even though the virtual channels may share certain physical resources (e.g. the interface 30A–30C on which the commands are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received.

Generally speaking, a node may include one or more coherent agents (dotted enclosure 16 in FIG. 1). In the embodiment of FIG. 1, the processors 12A–12N, the L2 cache 36, and the memory controller 14 may be examples of coherent agents 16. Additionally, the memory bridge 32 may be a coherent agent (on behalf of other nodes). However, other embodiments may include other coherent agents as well, such as a bridge to one or more I/O interface circuits, or the I/O interface circuits themselves. Generally, an agent includes any circuit which participates in transactions on an interconnect. A coherent agent is an agent that is capable of performing coherent transactions and operating in a coherent fashion with regard to transactions. A transaction is a communication on an interconnect. The transaction is sourced by one agent on the interconnect, and may have one or more agents as a target of the transaction. Read transactions specify a transfer of data from a target to the source, while write transactions specify a transfer of data from the source to the target. Other transactions may be used to communicate between agents without transfer of data, in some embodiments.

Each of the interface circuits 20A–20C are configured to receive and transmit on the respective interfaces 30A–30C to which they are connected. The Rx circuits 26A–26C handle the receiving of communications from the interfaces 30A–30C, and the Tx circuits 28A–28C handle the transmitting of communications on the interfaces 30A–30C.

Each of the interfaces 30A–30C used for coherent communications are defined to be capable of transmitting and receiving coherency commands. Particularly, in the embodiment of FIG. 1, those interfaces 30A–30C may be defined to receive/transmit coherency commands to and from the node 10 from other nodes. Additionally, other types of commands may be carried. In one embodiment, each interface 30A–30C may be a HyperTransport™ (HT) interface, including an extension to the HT interface to include coherency commands (HTcc). Additionally, in some embodiments, an extension to the HyperTransport interface to carry packet data (Packet over HyperTransport, or PoHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc.

In some embodiments, one or more of the interface circuits 20A–20C may not be used for coherency management and may be defined as packet interfaces. Such interfaces 30A–30C may be HT interfaces. Alternative, such interfaces 30A–30C may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In the illustrated embodiment, each interface circuit 20A–20C may be configurable to communicate on either the SPI-4 interface or the HT interface. Each interface circuit 20A–20C may be individually programmable, permitting various combinations of the HT and SPI-4interfaces as interfaces 30A–30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The packet interfaces may carry packet data directly (e.g. transmitting the packet data with various control information indicating the start of packet, end of packet, etc.) or indirectly (e.g. transmitting the packet data as a payload of a command, such as PoHT).

In embodiments which also support packet traffic, the node 10 may also include a packet direct memory access (DMA) circuit configured to transfer packets to and from the memory 24 on behalf of the interface circuits 20A–20C. The switch 18 may be used to transmit packet data from the interface circuits 20A–20C to the packet DMA circuit and from the packet DMA circuit to the interface circuits 20A–20C. Additionally, packets may be routed from an Rx circuit 26A–26C to a Tx circuit 28A–28C through the switch 18, in some embodiments.

The processors 12A–12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The node 10 may include any number of processors (e.g. as few as one processor, two processors, four processors, etc.).

The L2 cache 36 may be any type and capacity of cache memory, employing any organization (e.g. set associative, direct mapped, fully associative, etc.). In one embodiment, the L2 cache 36 may be an 8 way, set associative, 1 MB cache. The L2 cache 36 is referred to as L2 herein because the processors 12A–12N may include internal (L1) caches. In other embodiments the L2 cache 36 may be an L1 cache, an L3 cache, or any other level as desired.

The memory controller 14 is configured to access the memory 24 in response to read and write transactions received on the interconnect 22. The memory controller 14 may receive a hit signal from the L2 cache, and if a hit is detected in the L2 cache for a given read/write transaction, the memory controller 14 may not respond to that transaction. The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the node 10 may include additional circuitry, not shown in FIG. 1. For example, the node 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the node 10 (and more particularly the processors 12A–12N, the memory controller 14, the L2 cache 36, the interface circuits 20A–20C, the memory bridge 32 including the remote line directory 34, the switch 18, the configuration register 38, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A–20C are illustrated in FIG. 1, one or more interface circuits may be implemented in various embodiments. As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

Figure 2:
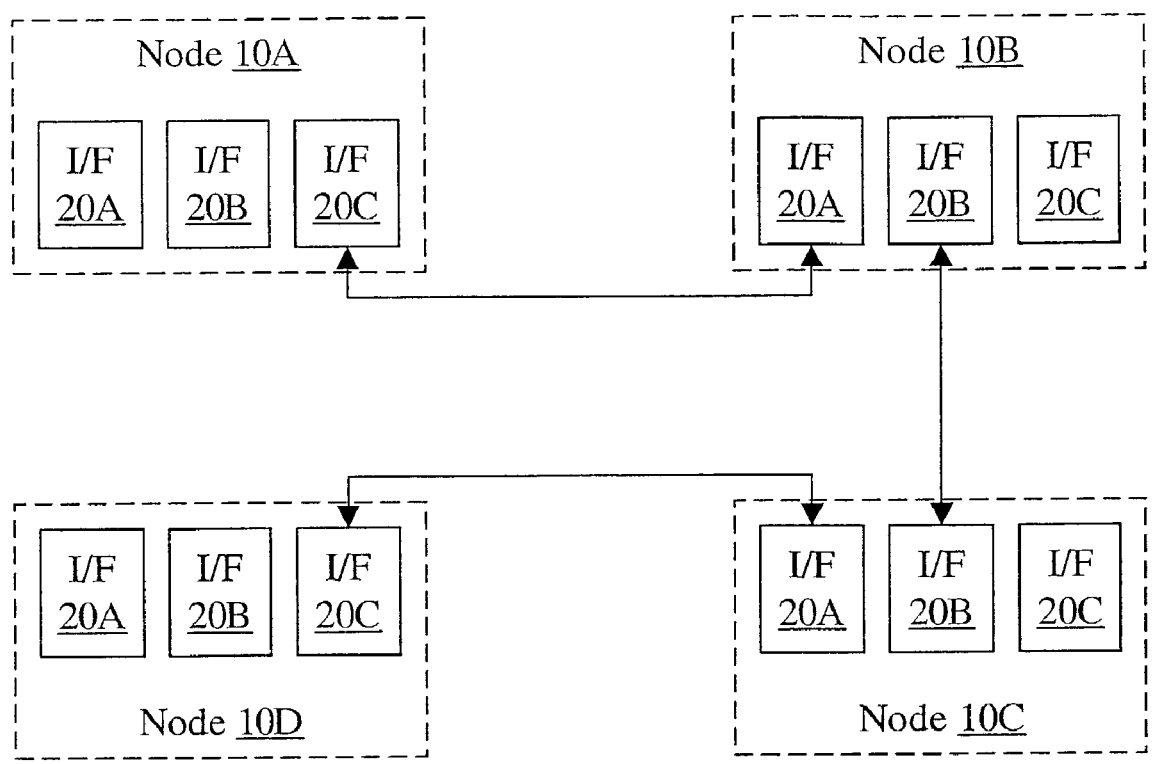
FIG. 2 is a block diagram of one embodiment of several nodes coupled into a system.

Turning next to FIG. 2, a block diagram of one embodiment of a coherent system 40 is shown. In the embodiment of FIG. 2, the system 40 includes a plurality of nodes 10A–10D. Each of nodes 10A–10D may be instantiations of the node 10. In the embodiment of FIG. 2, the node 10A is coupled to the node 10B, which is further coupled to the node 10C, which is still further coupled to the node 10D. Particularly, the interface circuit 20C of the node 10A is coupled to an interface to which the interface circuit 20A of the node 10B is coupled. The interface circuit 20B of the node 10B is coupled to an interface to which the interface circuit 20B of the node 10C is coupled. The interface circuit 20A of the node 10C is coupled to an interface to which the node 10D is coupled.

The nodes 10A–10D may use the interfaces to communicate coherently between the nodes. That is, coherency commands generated by the memory bridges 32 in the nodes 10A–10D may be transmitted over the interfaces between the nodes. Additionally, in some embodiments, other types of commands may be transmitted. For example, in one embodiment, the interfaces may be HT interfaces, as mentioned above with respect to FIG. 1. Thus, HT commands, HTcc commands, and/or PoHT commands may be transmitted in various embodiments. The HT interface may comprise a pair of point-to-point links between each interface. For example, the interface between the interface circuit 20C of the node 10A and the interface circuit 20A of the node 10B may comprise a pair of point-to-point links, one link driven by the interface circuit 20C of the node 10A to the interface circuit 20A of the node 10B and the other link drive by the interface circuit 20A of the node 10B to the interface circuit 20C of the node 10A. Other interfaces may similarly be point-to-point links. In other embodiments, any type of interface may be used.

In the embodiment of FIG. 2, the nodes 10A–10D are interconnected in a daisy chain fashion. This interconnection may be used for standard HT commands. In other embodiments, any interconnection may be used for HTcc commands. For example, in an embodiment, the nodes 10A–10D may each be directly coupled to each other node (using one of the three interface circuits 20A–20C to couple to an interface circuit of each other node). Some of the connections may be used to provide the daisy chain routing for standard HT commands.

While four nodes 10A–10D are illustrated in the coherent system 40, other embodiments may employ any number of nodes, as desired. The nodes may be connected in any desired configuration using the interface circuits 20A–20C. If the HT interface is used, and standard HT commands are used in the coherent system 40 (in addition to the HTcc commands), the connection may include a daisy chain path that reaches each node.

Turning next to FIG. 3, a table 42 is shown illustrating an exemplary set of transactions supported by one embodiment of the interconnect 22 and a table 44 is shown illustrating an exemplary set of coherency commands supported by one embodiment of the interfaces 30. Other embodiments including subsets, supersets, or alternative sets of commands may be used.

The transactions illustrated in the table 42 will next be described. An agent in the node 10 may read a cache block (either remote or local) using the read shared (RdShd) or read exclusive (RdExc) transactions on the interconnect 22. The RdShd transaction is used to request a shared copy of the cache block, and the RdExc transaction is used to request an exclusive copy of the cache block. If the RdShd transaction is used, and no other agent reports having a copy of the cache block during the response phase of the transaction (except for the L2 cache 36 and/or the memory controller 14), the agent may take the cache block in the exclusive state. In response to the RdExc transaction, other agents in the node invalidate their copies of the cache block (if any). Additionally, an exclusive (or modified) owner of the cache block may supply the data for the transaction in the data phase. Other embodiments may employ other mechanisms (e.g. a retry on the interconnect 22) to ensure the transfer of a modified cache block.

The write transaction (Wr) and the write invalidate transaction (WrInv) may be used by an agent to write a cache block to memory. The Wr transaction may be used by an owner having the modified state for the block, since no other copies of the block need to be invalidated. The WrInv transaction may be used by an agent that does not have exclusive ownership of the block (the agent may even have the invalid state for the block). The WrInv transaction causes other agents to invalidate any copies of the block, including modified copies. The WrInv transaction may be used by an agent that is writing the entire cache block. For example, a DMA that is writing the entire cache block with new data may use the transaction to avoid a read transaction followed by a write transaction.

The RdKill and RdInv transactions may be used by the memory bridge 32 in response to probes received by the node 10 from other nodes. The RdKill and RdInv transactions cause the initiator (the memory bridge 32) to acquire exclusive access to the cache block and cause any cache agents to invalidate their copies (transferring data to the initiator similar to the RdShd and RdExc transactions). In one embodiment, the RdKill transaction also cancels a reservation established by the load-linked instruction in the MIPS instruction set, while the RdInv transaction does not. In other embodiments, a single transaction may be used for probes. In still other embodiments, there may be a probe-generated transaction that invalidates agent copies of the cache block (similar to the RdKill and RdInv transactions) and another probe-generated transaction that permits agents to retain shared copies of the cache block.

The WrFlush transaction is a write transaction which may be initiated by an agent and another agent may have an exclusive or modified copy of the block. The other agent provides the data for the WrFlush transaction, or the initiating agent provides the data if no other agent has an exclusive or modified copy of the block. The WrFlush transaction may be used, in one embodiment described below in which the L2 cache 36 retains the node state for the node 10 but other agents may have the cache block in a modified state as well. The L2 cache 36 may use the WrFlush command to evict a remote cache block which may be modified in a cache of another agent in the node 10.

The Nop transaction is a no-operation transaction. The Nop may be used if an agent is granted use of the interconnect 22 (e.g. the address bus, in embodiments in which the interconnect 22 is a split transaction bus) and the agent determines that it no longer has a transaction to run on the interconnect 22.

The commands illustrated in the table 44 will next be described. In the table 44, the command is shown as well as the virtual channel in which the command travels on the interfaces 30. The virtual channels may include, in the illustrated embodiment: the coherent read (CRd) virtual channel; the probe (Probe) virtual channel; the acknowledge (Ack) virtual channel; and coherent fill (CFill) virtual channel. The CRd, Probe, Ack, and CFill virtual channels are defined for the HTcc commands. There may be additional virtual channels for the standard HT commands (e.g. non-posted command (NPC) virtual channel, the posted command (PC) virtual channel, and the response (RSP) virtual channel).

The cRdShd or cRdExc commands may be issued by the memory bridge 32 in response to a RdShd or RdExc transactions on the interconnect 22, respectively, to read a remote cache block not stored in the node (or, in the case of RdExc, the block may be stored in the node but in the shared state). If the cache block is stored in the node (with exclusive ownership, in the case of the RdExc transaction), the read is completed on the interconnect 22 without any coherency command transmission by the memory bridge 32.

The Flush and Kill commands are probe commands for this embodiment. The memory bridge 32 at the home node of a cache block may issue probe commands in response to a cRdShd or cRdExc command. The memory bridge 32 at the home node of the cache block may also issue a probe command in response to a transaction for a local cache block, if one or more remote nodes has a copy of the cache block. The Flush command is used to request that a remote modified owner of a cache block return the cache block to the home node (and invalidate the cache block in the remote modified owner). The Kill command is used to request that a remote owner invalidate the cache block. In other embodiments, additional probe commands may be supported for other state change requests (e.g. allowing remote owners to retain a shared copy of the cache block).

The probe commands are responded to (after effecting the state changes requested by the probe commands) using either the Kill_Ack or WB commands. The Kill_Ack command is an acknowledgement that a Kill command has been processed by a receiving node. The WB command is a write back of the cache block, and is transmitted in response to the Flush command. The WB command may also be used by a node to write back a remote cache block that is being evicted from the node.

The Fill command is the command to transfer data to a remote node that has transmitted a read command (cRdExc or cRdShd) to the home node. The Fill command is issued by the memory bridge 32 in the home node after the probes (if any) for a cache block have completed.

Figure 4:
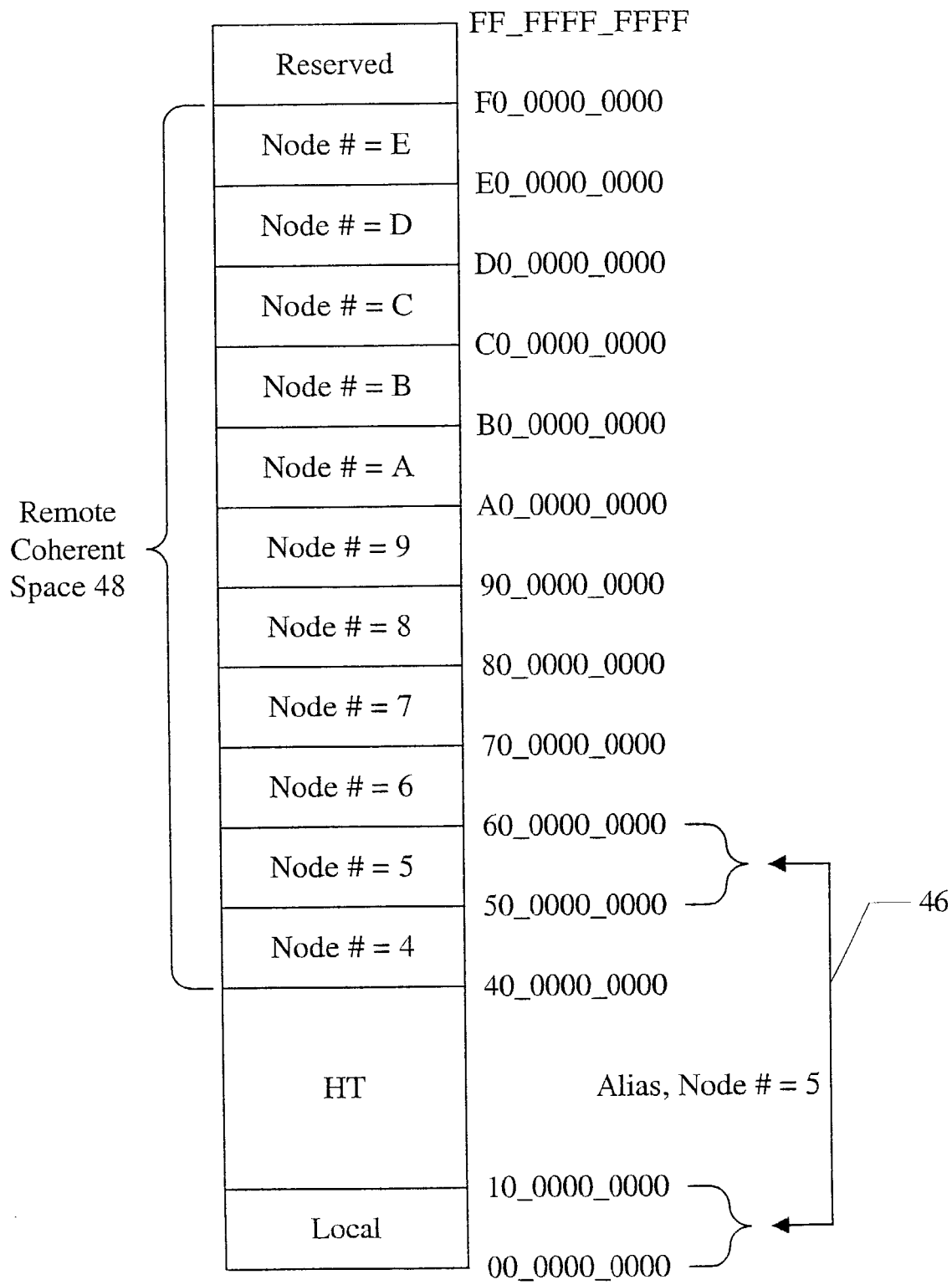
FIG. 4 is a block diagram of an address space supported by one embodiment of the nodes shown in FIGS. 1 and 2.

Turning next to FIG. 4, a block diagram illustrating one embodiment of an address space implemented by one embodiment of the node 10 is shown. Addresses shown in FIG. 4 are illustrated as hexadecimal digits, with an under bar ("_") separating groups of four digits. Thus, in the embodiment illustrated in FIG. 4, 40 bits of address are supported. In other embodiments, more or fewer address bits may be supported.

In the embodiment of FIG. 4, the address space between 00_0000_0000 and 0F_FFFF_FFFF is treated as local address space. Transactions generated by agents in the local address space do not generate coherency commands to other nodes, although coherency may be enforced within the node 10 for these addresses. That is, the local address space is not maintained coherent with other nodes. Various portions of the local address space may be memory mapped to I/O devices, HT, etc. as desired.

The address space between 40_0000_0000 and EF_FFFF_FFFF is the remote coherent space 48. That is, the address space between 40_0000_0000 and EF_FFFF_FFFF is maintained coherent between the nodes. Each node is assigned a portion of the remote coherent space, and that node is the home node for the portion. As shown in FIG. 1, each node is programmable with a node number. The node number is equal to the most significant nibble (4 bits) of the addresses for which that node is the home node, in this embodiment. Thus, the node numbers may range from 4 to E in the embodiment shown. Other embodiments may support more or fewer node numbers, as desired. In the illustrated embodiment, each node is assigned a 64 Gigabyte (GB) portion of the memory space for which it is the home node. The size of the portion assigned to each node may be varied in other embodiments (e.g. based on the address size or other factors).

For a given coherent node, there is an aliasing between the remote coherent space for which that node is the home node and the local address space of that node. That is, corresponding addresses in the local address space and the portion of the remote coherent space for which the node is the home node access the same memory locations in the memory 24 of the node (or are memory mapped to the same I/O devices or interfaces, etc.). For example, the node having node number 5 aliases the address space 50_0000_0000 through 5F_FFFF_FFFF to 00_0000_0000 through 0F_FFFF_FFFF respectively (arrow 46). Internode coherent accesses to the memory 24 at the node 10 use the node-numbered address space (e.g. 50_0000_0000 to 5F_FFFF_FFFF, if the node number programmed into node 10 is 5) to access cache blocks in the memory 24. That is agents in other nodes and agents within the node that are coherently accessing cache blocks in the memory use the remote coherent space, while access in the local address space are not maintained coherent with other nodes (even though the same cache block may be accessed). Thus the addresses are aliased, but not maintained coherent, in this embodiment. In other embodiments, the addresses in the remote coherent space and the corresponding addresses in the local address space may be maintained coherent.

A cache block is referred to as local in a node if the cache block is part of the memory assigned to the node (as mentioned above). Thus, the cache block may be local if it is accessed from the local address space or the remote coherent space, as long as the address is in the range for which the node is the home node. Similarly, a transaction on the interconnect 22 that accesses a local cache block may be referred to as a local transaction or local access. A transaction on the interconnect 22 that accesses a remote cache block (via the remote coherent address space outside of the portion for which the node is the home node) may be referred to as a remote transaction or a remote access.

The address space between 10_0000_0000 and 3F_FFFF_FFFF may be used for additional HT transactions (e.g. standard HT transactions) in the illustrated embodiment. Additionally, the address space between F0_0000_0000 and FF_FFFF_FFFF may be reserved in the illustrated embodiment.

It is noted that, while the most significant nibble of the address defines which node is being accessed, other embodiments may use any other portion of the address to identify the node. Furthermore, other information in the transaction may be used to identify remote versus local transactions, in other embodiments (e.g. command type, control information transmitted in the transaction, etc.).

Figure 5:
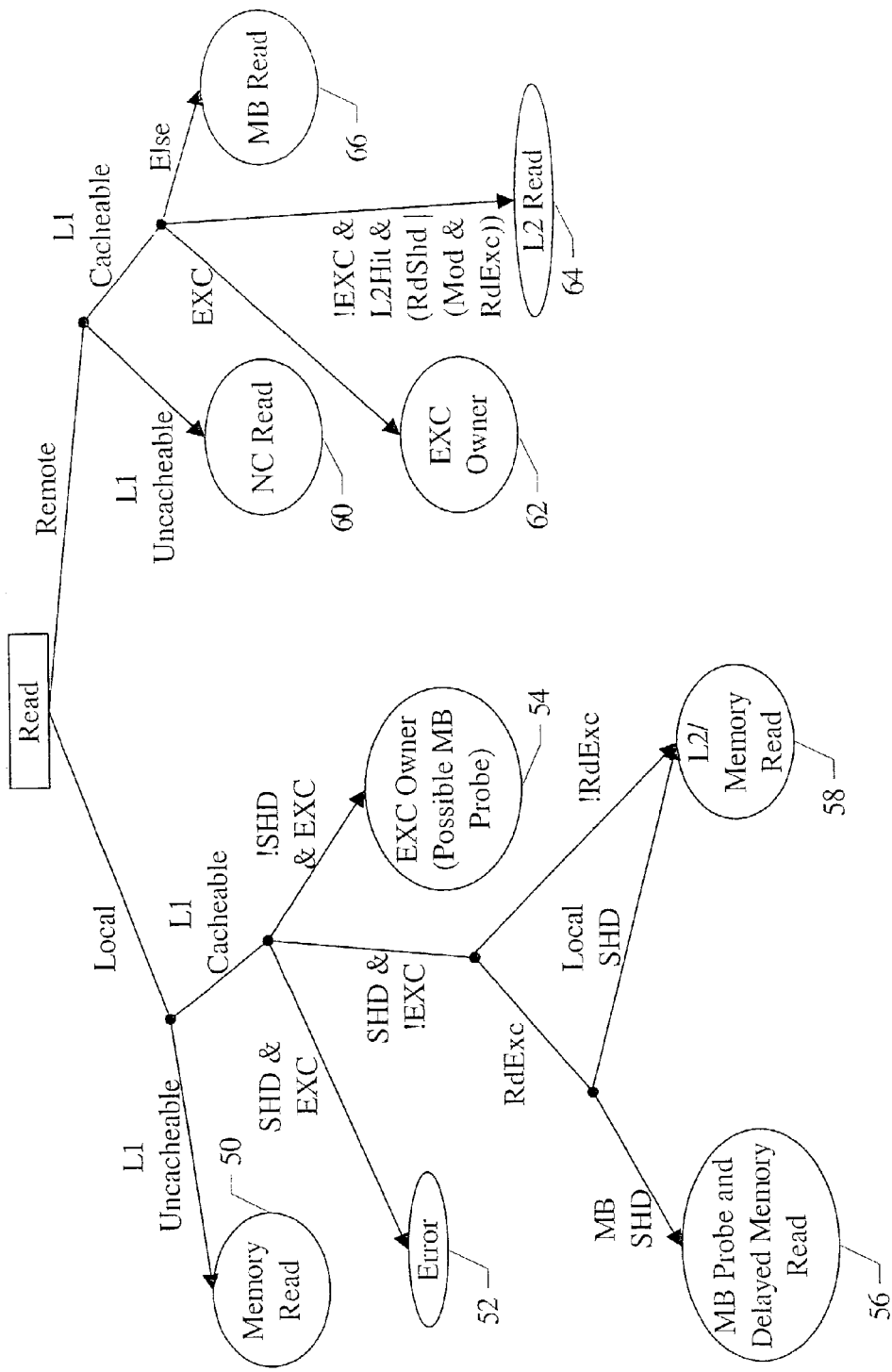
FIG. 5 is a decision tree illustrating operation of one embodiment of a node for a read transaction on the interconnect within the node.

Turning next to FIG. 5, a decision tree for a read transaction to a memory space address on the interconnect 22 of a node 10 is shown for one embodiment. The decision tree may illustrate operation of the node 10 for the read transaction for different conditions of the transaction, the state of the cache block accessed by the transaction, etc. The read transaction may, in one embodiment, include the RdShd, RdExc, RdKill, and RdInv transactions shown in the table 42 of FIG. 3. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 5, the exclamation point ("!") is used to indicate a logical NOT. Not shown in FIG. 5 is the state transition made by each coherent agent which is caching a copy of the cache block for the read transaction. If the read transaction is RdShd, the coherent agent may retain a copy of the cache block in the shared state. Otherwise, the coherent agent invalidates its copy of the cache block.

The transaction may be either local or remote, as mentioned above. For local transactions, if the transaction is uncacheable, then a read from the memory 24 is performed (reference numeral 50). In one embodiment, the transaction may include an indication of whether or not the transaction is cacheable. If the transaction is uncacheable, it is treated as a non-coherent transaction in the present embodiment.

If the local transaction is cacheable, the operation of the node 10 is dependent on the response provided during the response phase of the transaction. In one embodiment, each coherent agent responds with the state of the cache block in that agent. For example, each coherent agent may have an associated shared (SHD) and exclusive (EXC) signal. The agent may signal invalid state by deasserting both the SHD and EXC signals. The agent may signal shared state by asserting the SHD signal and deasserting the EXC signal. The agent may signal exclusive state (or modified state) by asserting the EXC signal and deasserting the SHD signal. The exclusive and modified states may be treated the same in the response phase in this embodiment, and the exclusive/modified owner may provide the data. The exclusive/modified owner may provide, concurrent with the data, an indication of whether the state is exclusive or modified. While each agent may have its own SHD and EXC signals in this embodiment (and the initiating agent may receive the signals from each other agent), in other embodiments a shared SHD and EXC signal may be used by all agents.

If both the SHD and EXC responses are received for the local transaction, an error has occurred (reference numeral 52). The memory controller may return a fatal error indication for the read transaction, in one embodiment. If the response is exclusive (SHD deasserted, EXC asserted) the exclusive owner provides the data for the read transaction on the interconnect 20 (reference numeral 54). If the exclusive owner is the memory bridge 32 (as recorded in the remote line directory 34), then a remote node has the cache block in the modified state. The memory bridge 32 issues a probe (Flush command) to retrieve the cache block from that remote node. The memory bridge 32 may supply the cache block returned from the remote node as the data for the read on the interconnect 22.

If the response is shared (SHD asserted, EXC deasserted), the local transaction is RdExc, and the memory bridge 32 is one of the agents reporting shared, then at least one remote node may have a shared copy of the cache block. The memory bridge 32 may initiate a probe (Kill command) to invalidate the shared copies of the cache block in the remote node(s) (reference numeral 56). In one embodiment, the data may be read from memory (or the L2 cache 36) for this case, but the transfer of the data may be delayed until the remote node(s) have acknowledged the probe. The memory bridge 32 may signal the memory controller 14/L2 cache 36 when the acknowledgements have been received. In one embodiment, each transaction may have a transaction identifier on the interconnect 22. The memory bridge 32 may transmit the transaction identifier of the RdExc transaction to the memory controller 14/L2 cache 36 to indicate that the data may be transmitted.

If the response is shared, the local transaction is RdExc, and the sharing agents are local agents (i.e. the memory bridge 32 does not report shared), then the L2 cache 36 or the memory controller 14 may supply the data, depending on whether or not there is an L2 hit for the cache block (reference numeral 58). Similarly, if the response is shared and the transaction is not RdExc, the L2 cache 36 or the memory controller 14 may supply the data dependent on whether or not there is an L2 hit for the cache block.

If the transaction is remote and uncacheable, then the memory bridge 32 may generate a noncoherent read command on the interfaces 30 to read the data. For example, a standard HT read command may be used (reference numeral 60). If the remote transaction is cacheable and the response on the interconnect 22 is exclusive, then the exclusive owner supplies the data for the read (reference numeral 62). If the remote transaction is cacheable, the response is not exclusive, the cache block is an L2 cache hit, and the transaction is either RdShd or the transaction is RdExc and the L2 cache has the block in the modified state, then the L2 cache 36 supplies the data for the read (reference numeral 64). Otherwise, the memory bridge 32 initiates a corresponding read command to the home node of the cache block (reference numeral 66).

Figure 6:
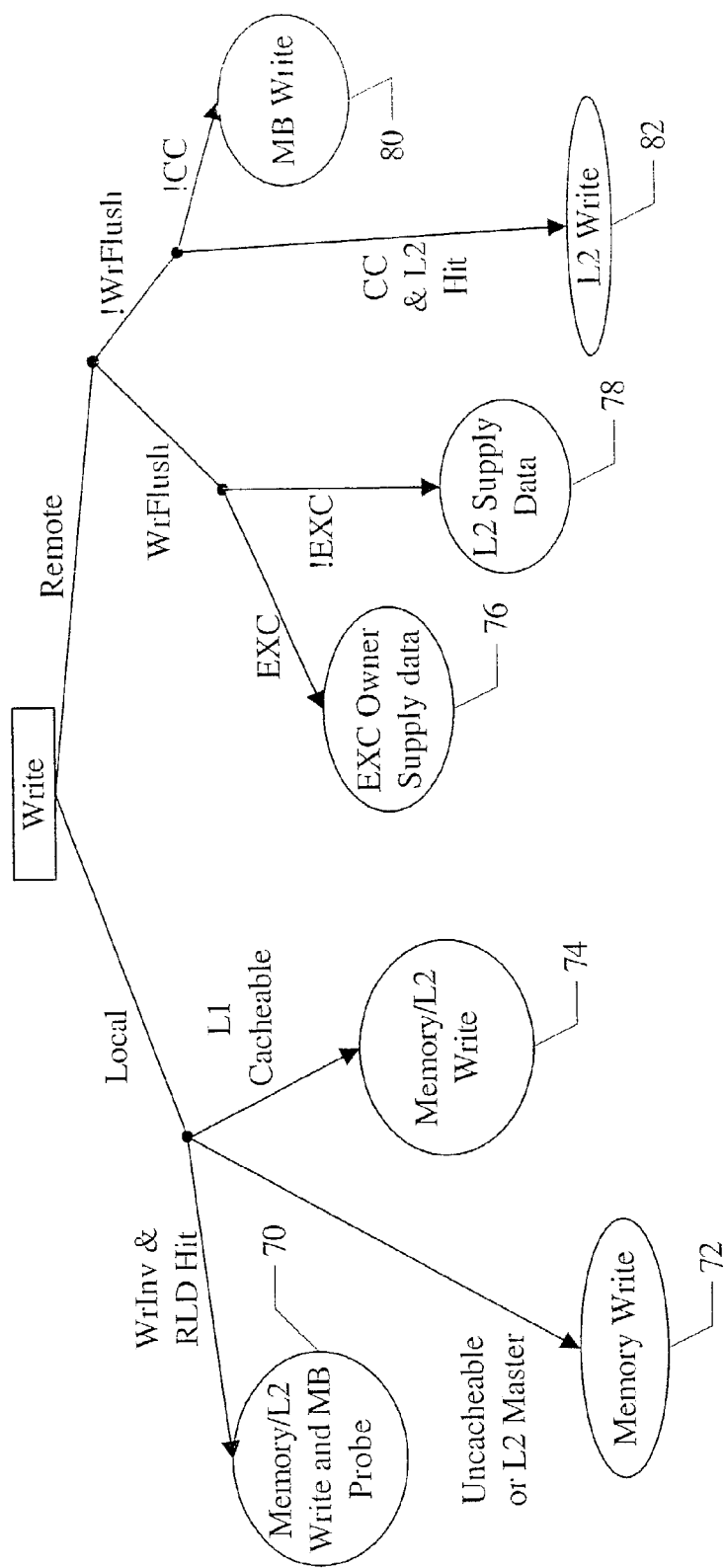
FIG. 6 is a decision tree illustrating operation of one embodiment of a node for a write transaction on the interconnect within the node.

Turning next to FIG. 6, a decision tree for a write transaction to a memory space address on the interconnect 22 of a node 10 is shown for one embodiment. The decision tree may illustrate operation of the node for the write transaction for different conditions of the transaction, the state of the cache block accessed by the transaction, etc. The write transaction may, in one embodiment, include the Wr, WrInv, and WrFlush transactions shown in the table 42 of FIG. 3. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 6, the exclamation point ("!") is used to indicate a logical NOT. Not shown in FIG. 6 is the state transition made by each coherent agent which is caching a copy of the cache block for the write transaction. The coherent agent invalidates its copy of the cache block.

If the transaction is a local transaction, and the transaction is a WrInv transaction that hits in the remote line directory 34 (i.e. a remote node is caching a copy of the cache block), the memory controller 14 (and the L2 cache 36, if an L2 hit) updates with the write data (reference numeral 70). Additionally, the memory bridge 32 may generate probes to the remote nodes indicated by the remote line directory 34. The update of the memory/L2 cache may be delayed until the probes have been completed, at which time the memory bridge 32 may transmit the transaction identifier of the WrInv transaction to the L2 cache 36/memory controller 14 to permit the update.

If the local transaction is uncacheable or if the L2 cache 36 is the master of the transaction (that is, the L2 cache 36 initiated the transaction), then the memory controller 14 updates with the data (reference numeral 72). If the local transaction is cacheable, the memory controller 14 and/or the L2 cache 36 updates with the data based on whether or not there is an L2 cache hit (and, in some embodiments, based on an L2 cache allocation indication in the transaction, which allows the source of the transaction to indicate whether or not the L2 cache allocates a cache line for an L2 cache miss) (reference numeral 74).

If the transaction is a remote transaction, the transaction is a WrFlush transaction, and the response to the transaction is exclusive, the exclusive owner supplies the data (reference numeral 76). If the remote WrFlush transaction results in a non-exclusive response (shared or invalid), the L2 cache 36 supplies the data of the WrFlush transaction. In one embodiment, the L2 cache 36 retains the state of the node as recorded in the home node, and the L2 cache 36 uses the WrFlush transaction to evict a remote cache block which is in the modified state in the node. Thus, if another agent has the cache block in the exclusive state, that agent may have a more recent copy of the cache block that should be returned to the home node. Otherwise, the L2 cache 36 supplies the block to be returned to the home node. In either case, the memory bridge 32 may capture the WrFlush transaction and data, and may perform a WB command to return the cache block to the home node.

If the remote transaction is not a WrFlush transaction, and is not cache coherent, the memory bridge 32 receives the write transaction and performs a noncoherent Wr command (e.g. a standard HT write) to transmit the cache block to the home node (reference numeral 80). If the remote transaction is not a WrFlush transaction, is cache coherent, and is an L2 hit, the L2 cache 36 may update with the data (reference numeral 82).

Figure 7:
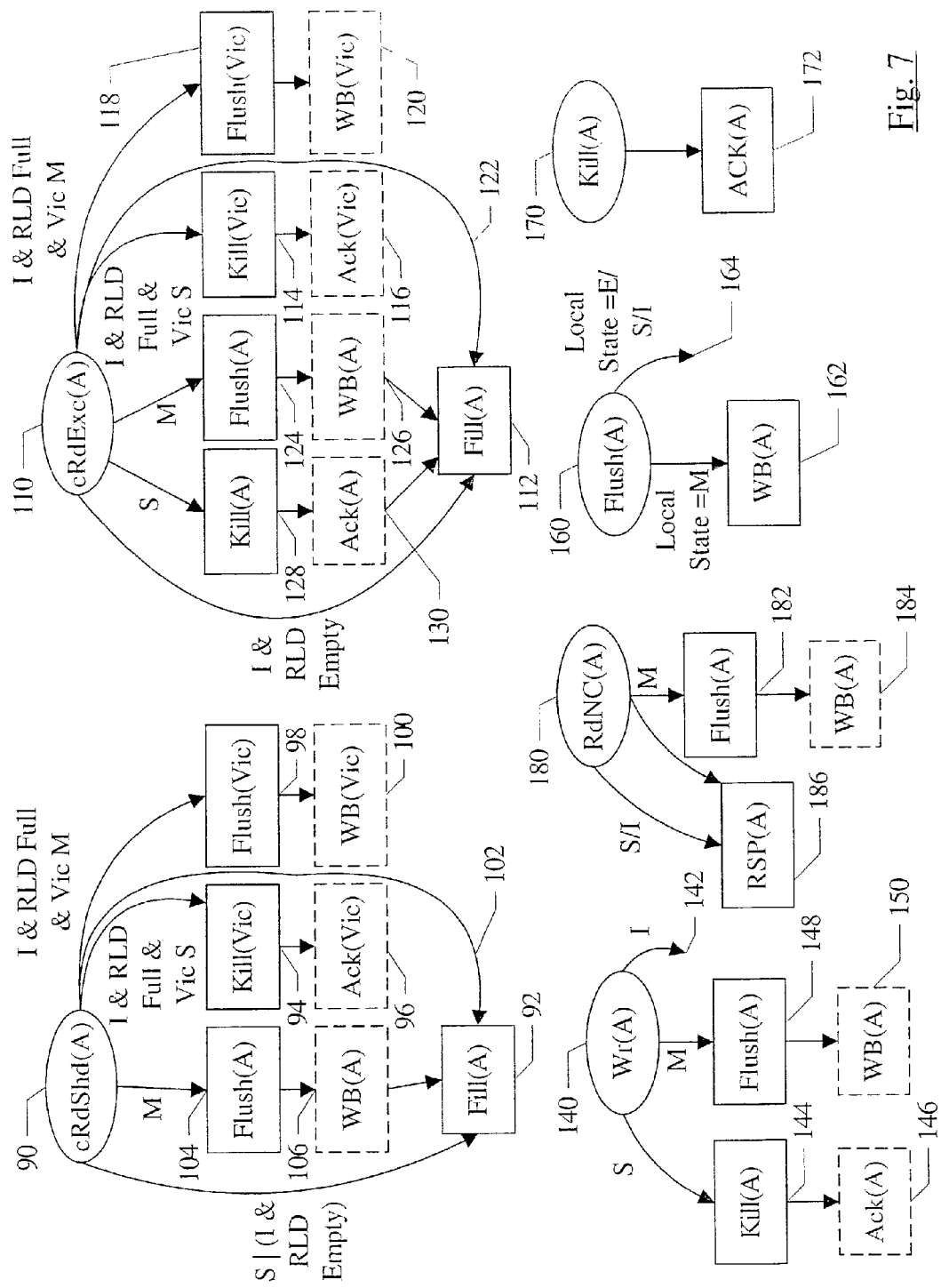
FIG. 7 is a diagram illustrating operation of one embodiment of the memory bridge for remote coherency commands received by the memory bridge.

Turning next to FIG. 7, a block diagram illustrating operation of one embodiment of the memory bridge 32 in response to various coherency commands received from the interface circuits 20A–20C is shown. The received command is shown in an oval. Commands initiated by the memory bridge 32 in response to the received command (and the state of the affected cache block as indicated in the remote line directory 34) are shown in solid boxes. Dotted boxes are commands received by the memory bridge 32 in response to the commands transmitted in the preceding solid boxes. The cache block affected by a command is shown in parentheses after the command.

In one embodiment, the remote line directory 34 may be accessed in response to a transaction on the interconnect 22. In such an embodiment, the memory bridge 32 may initiate a transaction on the interconnect 22 in response to certain coherent commands in order to retrieve the remote line directory 34 (as well as to affect any state changes in the coherent agents coupled to the interconnect 22, if applicable). In other embodiments, the memory bridge 32 may be configured to read the remote line directory 34 prior to generating a transaction on the interconnect 22, and may conditionally generate a transaction if needed based on the state of the remote line directory 34 for the requested cache block. Additionally, in one embodiment, the remote line directory 34 may maintain the remote state for a subset of the local cache blocks that are shareable remotely (e.g. a subset of the portion of the remote coherent space 48 that is assigned to the local node). If a cache block is requested by a remote node using a coherency command and there is no entry in the remote line directory 34 for the cache block, then a victim cache block may be replaced in the remote line directory 34 (and probes may be generated to invalidate the victim cache block in remote nodes). In other embodiments, the remote line directory 34 may be configured to track the state of each cache block in the portion of the remote coherent space 48 that is assigned to the local node. In such embodiments, operations related to the victim cache blocks may be omitted from FIG. 7.

For a cRdShd command for cache block "A" received by the memory bridge 32 (reference numeral 90), the memory bridge 32 may generate a RdShd transaction on the interconnect 22. Based on the remote line directory (RLD) state for the cache block A, a number of operations may occur. If the RLD state is shared, or invalid and there is an entry available for allocation without requiring a victim cache block to be evicted ("RLD empty" in FIG. 7), then the memory bridge 32 may transmit a fill command to the remote node with the data supplied to the memory bridge 32 in response to the RdShd transaction on the interconnect 22 (reference numeral 92). On the other hand, if the RLD state is invalid and an eviction of a victim block is used to free an RLD entry for cache block A, then the memory bridge 32 may transmit probes to the remote nodes having copies of the victim cache block. If the victim cache block is shared, the memory bridge 32 may transmit a Kill command (or commands, if multiple nodes are sharing the victim cache block) for the victim block (reference numeral 94). The remote nodes respond with Kill_Ack commands for the victim block (reference numeral 96). If the victim block is modified, the memory bridge 32 may transmit a Flush command to the remote node having the modified state (reference numeral 98). The remote node may return the modified block with a WB command (reference numeral 100). In either case of evicting a victim block, the memory bridge 32 may, in parallel, generate a Fill command for the cache block A (reference numeral 92, via arrow 102). Finally, if the RLD state is modified for the cache block A, the memory bridge 32 may generate a Flush command for the cache block A to the remote node (reference numeral 104), which responds with a WB command and the cache block A (reference numeral 106). The memory bridge 32 may then transmit the Fill command with the cache block A provided via the write back command (reference numeral 92).

In response to a cRdExc command for a cache block A (reference numeral 110), operation may be similar to the cRdShd case for some RLD states. Similar to the cRdShd case, the memory bridge 32 may initiate a RdExc transaction on the interconnect 22 in response to the cRdExc command. Similar to the cRdShd case, if the RLD is invalid and no eviction of a victim cache block is needed in the RLD to allocate an entry for the cache block A, then the memory bridge 32 may supply the cache block supplied on the interconnect 22 for the RdExc transaction in a fill command to the remote node (reference numeral 112). Additionally, if the RLD state is invalid for the cache block A and a victim cache block is evicted from the RLD 34, the memory bridge 32 may operate in a similar fashion to the cRdShd case (reference numerals 114 and 116 and arrow 122 for the shared case of the victim block and reference numerals 118 and 120 and arrow 122 for the modified case of the victim block). If the RLD state is modified for the cache block A, the memory bridge 32 may operate in a similar fashion to the cRdShd case (reference numerals 124 and 126). If the RLD state is shared for the cache block A, the memory bridge 32 may generate Kill commands for each remote sharing node (reference numeral 128). The memory bridge 32 may wait for the Kill_Ack commands from the remote sharing nodes (reference numeral 130), and then transmit the Fill command with the cache block A provided on the interconnect 22 in response to the RdExc transaction (reference numeral 112).

In response to a Wr command to the cache block A, the memory bridge 32 may generate a Wr transaction on the interconnect 22. If the RLD state is invalid for the cache block A, the memory bridge 32 may transmit the write data on the interconnect 22 and the Wr command is complete (reference numeral 142). If the RLD state is shared for the cache block A, the memory bridge 32 may generate Kill commands to each remote sharing node (reference numeral 144) and collect the Kill_Ack commands from those remote nodes (reference numeral 146) in addition to transmitting the data on the interconnect 22. If the RLD state is modified for a remote node, the memory bridge 32 may generate a Flush command to the remote node (reference numeral 148) and receive the WB command from the remote node (reference numeral 150). In one embodiment, the memory bridge 32 may delay transmitting the write data on the interconnect 22 until the WB command or Kill_Ack commands are received (although the data returned with the WB command may be dropped by the memory bridge 32).

The above commands are received by the memory bridge 32 for cache blocks for which the node 10 including the memory bridge 32 is the home node. The memory bridge 32 may also receive Flush commands or Kill commands for cache blocks for which the node 10 is a remote node. In response to a Flush command to the cache block A (reference numeral 160), the memory bridge 32 may initiate a RdKill or RdInv transaction on the interconnect 22. If the local state of the cache block is modified, the memory bridge 32 may transmit a WB command to the home node, with the cache block supplied on the interconnect 22 in response to the RdKill or RdInv transaction (reference numeral 162). If the local state of the cache block is not modified, the memory bridge 32 may not respond to the Flush command. In this case, the node may already have transmitted a WB command to the home node (e.g. in response to evicting the cache block locally). In response to a Kill command to the cache block A (reference numeral 170), the memory bridge 32 may initiate a RdKill or RdInv transaction on the interconnect 22. The memory bridge 32 may respond to the Kill command with a Kill_Ack command (reference numeral 172).

In one embodiment, the memory bridge 32 may also be configured to receive a non-cacheable read (RdNC) command (e.g. corresponding to a standard HT read) (reference numeral 180). In response, the memory bridge 32 may initiate a RdShd transaction on the interconnect 22. If the RLD state is modified for the cache block including the data to be read, the memory bridge 32 may transmit a Flush command to the remote node having the modified cache block (reference numeral 182), and may receive the WB command from the remote node (reference numeral 184). Additionally, the memory bridge 32 may supply data received on the interconnect 22 in response to the RdShd transaction as a read response (RSP) to the requesting node (reference numeral 186).

Figure 8:
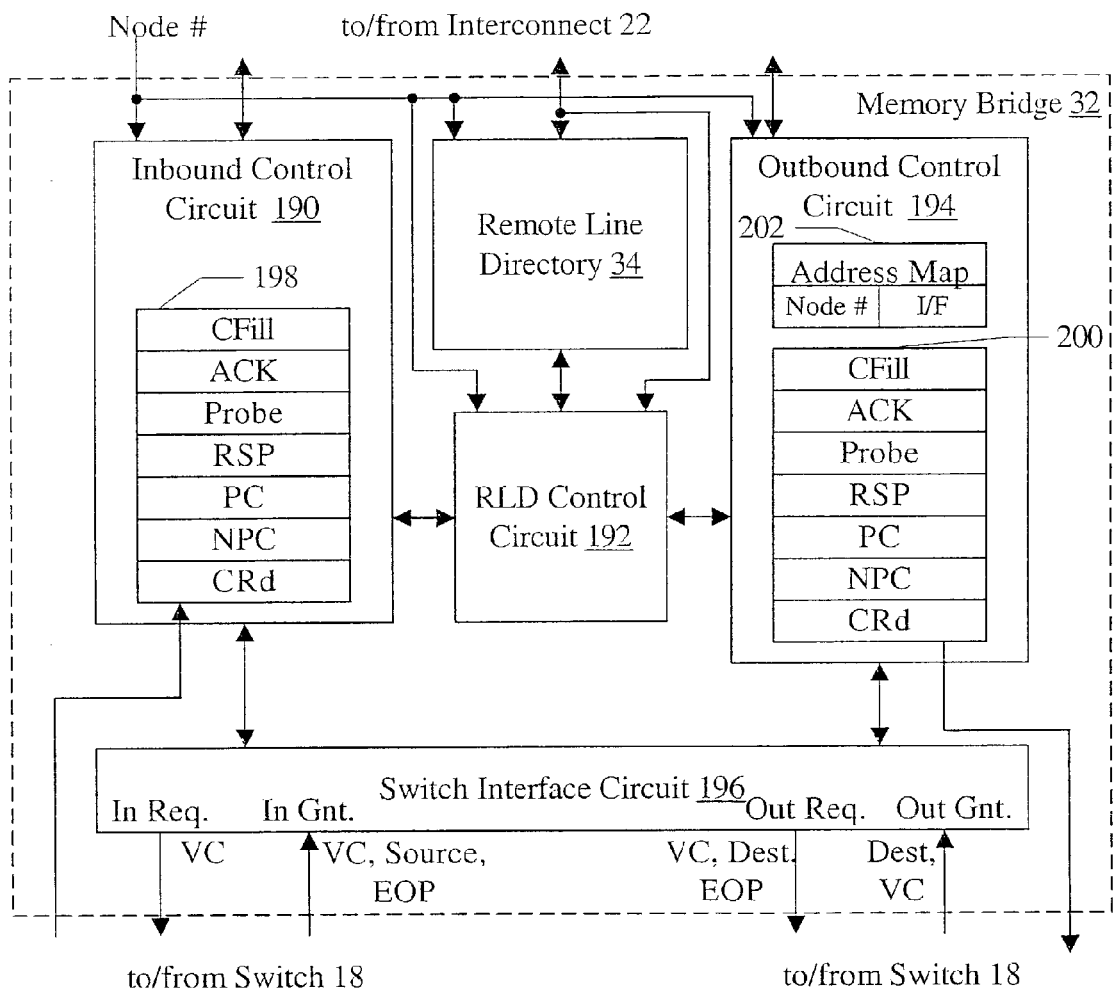
FIG. 8 is a block diagram of one embodiment of a memory bridge shown in FIG. 1.

Turning next to FIG. 8, a block diagram of one embodiment of the memory bridge 32 in more detail is shown. In the embodiment of FIG. 8, the memory bridge 32 includes an inbound control circuit 190, the remote line directory 34, an RLD control circuit 192, an outbound control circuit 194, and a switch interface circuit 196. Each of the inbound control circuit 190, the remote line directory 34, the RLD control circuit 192 and the outbound control circuit 194 are coupled to receive the node number (Node #) from the configuration register 38. Additionally, each of the inbound control circuit 190, the remote line directory 34, the RLD control circuit 192, and the outbound control circuit 194 are coupled to receive information from the interconnect 22 and/or transmit information to the interconnect 22. There may be an interconnect interface circuit (not shown) designed to communicate on the interconnect 22 on behalf of the above circuits, as desired. The remote line directory 34, the inbound control circuit 190, and the outbound control circuit 192 are coupled to the RLD control circuit 192. The inbound control circuit 190 and the outbound control circuit 194 are coupled to the switch interface circuit 196, which is further coupled to request/grant interfaces of the switch 18 for the inbound and outbound commands. The inbound control circuit 190 includes a set of inbound command buffers 198, which are coupled to receive data from the switch 18. The outbound control circuit 194 includes a set of outbound command buffers 200, which are coupled to provide data to the switch 18. The outbound control circuit 194 may further include an address map 202.

The inbound control circuit 190 may receive commands from other nodes via the switch 18, and may cause corresponding transactions to be initiated on the interconnect 22. The commands may be received into the inbound command buffers 200, which may include buffers for each virtual channel on which commands may be transmitted. Thus, in this example, the buffers may include CFill buffers for the CFill virtual channel, ACK buffers for the ACK virtual channel, Probe buffers for the probe virtual channel, RSP buffers for the RSP virtual channel, PC buffers for the PC virtual channel, and NPC buffers for the NPC virtual channel, and CRd buffers for the CRd virtual channel. The buffers 200 may actually comprise separate address and data buffers, where the address buffers store the address and other attributes of each command and the data buffers store corresponding data for those commands that carry data (e.g. a cache block). Generally, if the inbound control circuit 190 has an available buffer for a given virtual channel, it may signal the switch interface circuit, which may request data from the switch on that virtual channel. If a source (e.g. the interface circuits 20A–20C) has a command to transmit on that virtual channel and requests that virtual channel, the switch 18 may grant the virtual channel to that source and may inform the switch interface circuit 196 of the grant. The grant may include an indication of the source and the virtual channel that is granted, and may optionally include an end of packet (EOP) indication indicating whether or not the current transfer includes the last data included in the command. In one embodiment, the switch 18 may grant one transfer through the switch at a time, where a transfer includes up to 16 bytes. Thus, commands which are greater in size than 16 bytes may use more than one transfer through the switch 18.

The inbound control circuit 190 may generally select a command from any virtual channel for initiating a corresponding transaction on the interconnect 22. The inbound control circuit 190 may not enforce order between virtual channels, in general. One exception, for embodiments that also handle the standard HT commands, is the ordering rules among virtual channels employed by HT. The inbound control circuit 190 may follow these ordering rules for standard HT commands. In the absence of ordering constraints, any selection mechanism may be used to select an operation to be performed on the interconnect 22. For example, a round-robin type selection may be used among the virtual channels, and other round-robin type mechanisms may be used within the commands in each virtual channel. The buffer 198 allocated to a given transaction may be freed (to store another command) in response to the transaction being initiated on the interconnect 22, in some embodiments.

It is noted that some inbound commands may not result in transactions on the interconnect 22. For example, Kill_Ack commands may not be transmitted on the interconnect 22. Instead, the Kill_Ack commands may be counted with the corresponding probes in the outbound probe buffer (one of buffers 200). WB commands that are being dropped may not result in transactions on the interconnect 22. CFill commands may result in the data phase of a previous transaction on the interconnect 22.

The remote line directory 34 and the RLD control circuit 192 may monitor the interconnect 22 for the start of transactions on the interconnect 22. If a transaction addresses a local cache block in the remote coherent space 48 (e.g. the most significant nibble of the address matches the node number of the node), the RLD control circuit 192 may provide a response during the response phase of the transaction based on the state of the cache block in other nodes. The remote line directory 34 may output, to the RLD control circuit 192, an indication of whether the transaction is a hit or miss in the remote line directory 34, and may further output the state (including an indication of whether or not the block is modified and an indication of each sharing node). The RLD control circuit 192 may use the information to formulate the response. Additionally, if the transaction is a hit in the remote line directory 34 and the source of the transaction is the memory bridge 32 (e.g. the inbound control circuit 190), the RLD control circuit 192 may provide an update to the remote line directory 34. The remote line directory 34 may be updated for a transaction prior to the next possible transaction to the hitting line, so that the next transaction receives information from the remote line directory 34 that reflects the transaction. In one embodiment, the next possible transaction to the hitting line is subsequent to the response phase of the transaction, and so the update may be pipelined from the initial read (which occurs in response to the address phase of the transaction).

In one embodiment, the remote line directory 34 may track a subset of the shareable cache blocks in the node 10. That is, the remote line directory 34 may not be large enough to permit the sharing of all cache blocks within the portion of the remote coherent space 48 assigned to the node 10. In such embodiments, the remote line directory 34 may supply the probe buffers within the outbound command buffers 200 with probes corresponding to a victim cache block, if the transaction is a miss in the remote line directory 34 and the remote line directory 34 selects an entry that is currently allocated to the victim cache block to store the missing block information.

The outbound control circuit 194 may monitor the transactions on the interconnect 22 and may generate commands to be transmitted to other nodes in response to the transactions. The outbound control circuit 194 may receive the node number, and detect remote transactions using the node number. If the response to the remote transaction indicates that the node does not have sufficient ownership of the remote cache block to complete the transaction, the outbound control circuit 194 may generate a corresponding request to the home node for the cache block (e.g. cRdShd, cRdExc, or a noncoherent write).

Additionally, if the transaction is sourced by the inbound control circuit 190 (in response to a received command), the outbound control circuit 194 may generate a command. For example, if the transaction is in response to a probe command received by the inbound control circuit 190, the outbound control circuit 194 may generate an acknowledgement (Kill_Ack or WB) for the command.

If the transaction is sourced by the inbound control circuit 190 or any coherent agent in the node and is a transaction for which the node is the home node, the outbound control circuit 194 may generate probes as indicated in response to the transaction and the RLD state for the cache block. Additionally, the outbound control circuit 194 may capture fill data from the data phase of a read transaction generated by the inbound control circuit 190 in response to a read coherency command from another node, and may generate a Fill command to transmit the data to the other node. The outbound control circuit 194 may capture data for a RdNC transaction generated by the inbound control circuit 190 in response to a RdNC command, and generate a response (in the RSP virtual channel) for such reads.

Generally, the outbound control circuit 194 may select any command for transmission in a virtual channel. However, in some embodiments, there may be some ordering rules that the output control circuit 194 may follow. For example, requests to the same cache block may be serialized in the output control circuit 194 (e.g. read requests in the CRd command buffers). Additionally, probes to the same cache block may be serialized.

The outbound control circuit 194 may allocate an outbound NPC buffer in response to a transaction on the interconnect 22 that is to be transmitted to another node in the NPC virtual channel (e.g. a noncoherent read command or a noncoherent write command that is nonposted) and may free the buffer in response to transmitting the command to the switch 18. Similarly, an outbound PC buffer is allocated in response to a transaction on the interconnect 22 that is to be transmitted to another node in the PC virtual channel. The outbound control circuit 194 may allocate an outbound CRd buffer in response to a RdShd or RdExc transaction for which the local ownership is insufficient to complete the transaction, and may free the buffer in response to transmitting the command to the switch 18. An RSP buffer may be allocated in response to an NPC transaction initiated by the inbound control circuit 190. A CFill buffer may be allocated in response to a CRd transaction initiated by the inbound control circuit 190 to transmit the fill data. The RSP or CFill buffers free once the data has been transmitted to the switch 18. Probe buffers may be allocated in response to transactions on the interconnect 22 for which the node is the home node, or in response to a victim cache block from the remote line directory 34. In one embodiment, probe buffers remain allocated until the responses to the probes have been received. An ACK buffer may be allocated in response to initiation of a transaction responsive to a probe by the inbound control circuit 190, and may be freed when the acknowledgement (Kill_Ack or WB) is transmitted to the switch 18.

In the present embodiment, the outbound control circuit 194 may include the address map 202 for mapping node numbers (either from the address of a transaction or from indications from the remote line directory 34, for probes) to an interface circuit 20A–20C through which the command to the node should be transmitted. The address map 202 may be programmable by software (e.g. using configuration space commands, or as a set of configuration registers accessible to software). An indication of the interface circuit 20A–20C may be stored in the command buffers 200, or alternatively the mapping from node number to interface circuit may be performed as requests are made to the switch 18.

The outbound control circuit 194 may inform the switch interface circuit 196 when a command is ready to be transmitted to a given interface circuit 20A–20C on a given virtual channel. The switch interface circuit 196 may make requests for the identified interface circuit 20A–20C and the identified virtual channel (Dest and VC in FIG. 8). Additionally, the switch interface circuit 196 may indicates if the transfer, when granted, is the last transfer of the current command to that destination and virtual channel with the EOP indication. When a destination and virtual channel are granted, the switch interface circuit 196 may inform the outbound control circuit 194, which may transfer data from the selected VC buffer (particularly, from a command from the select VC buffer which is to be transmitted through the granted destination).

It is noted that the inbound and outbound control circuits 190 and 194 may employ flow control to ensure that the buffers for various virtual channels do not overflow. The inbound control circuit 190 flow control through the switch 18, by requesting transfers from the switch when buffers are available for a given virtual channel and not requesting transfers for virtual channels for which buffers are not available. The outbound control circuit 194 may use the flow control supported on the interconnect 22. In some embodiments, the interconnect 22 may support retry of transactions. In other embodiments, the interconnect 22 may support a source blocking scheme in which each agent that participates in various transactions may supply a block signal that is asserted to indicate whether or not it is capable of participating in a transaction of a given type, if it were to be transmitted on the interconnect 22. Each agent that sources transactions may receive the block signals, and may inhibit initiating a transaction if an agent that is to participate in that transaction, when initiated on the interconnect 22, has its block signal asserted. A given agent may have more than one block signal, for different types of transactions, different virtual channels, etc. In one embodiment, the outbound control circuit 194 may include a separate block signal for each outbound virtual channel, and may assert the corresponding block signal based on buffer availability in the outbound command buffers 200 for that virtual channel.

Intranode and Internode Ownership Transfer

Figure 9:
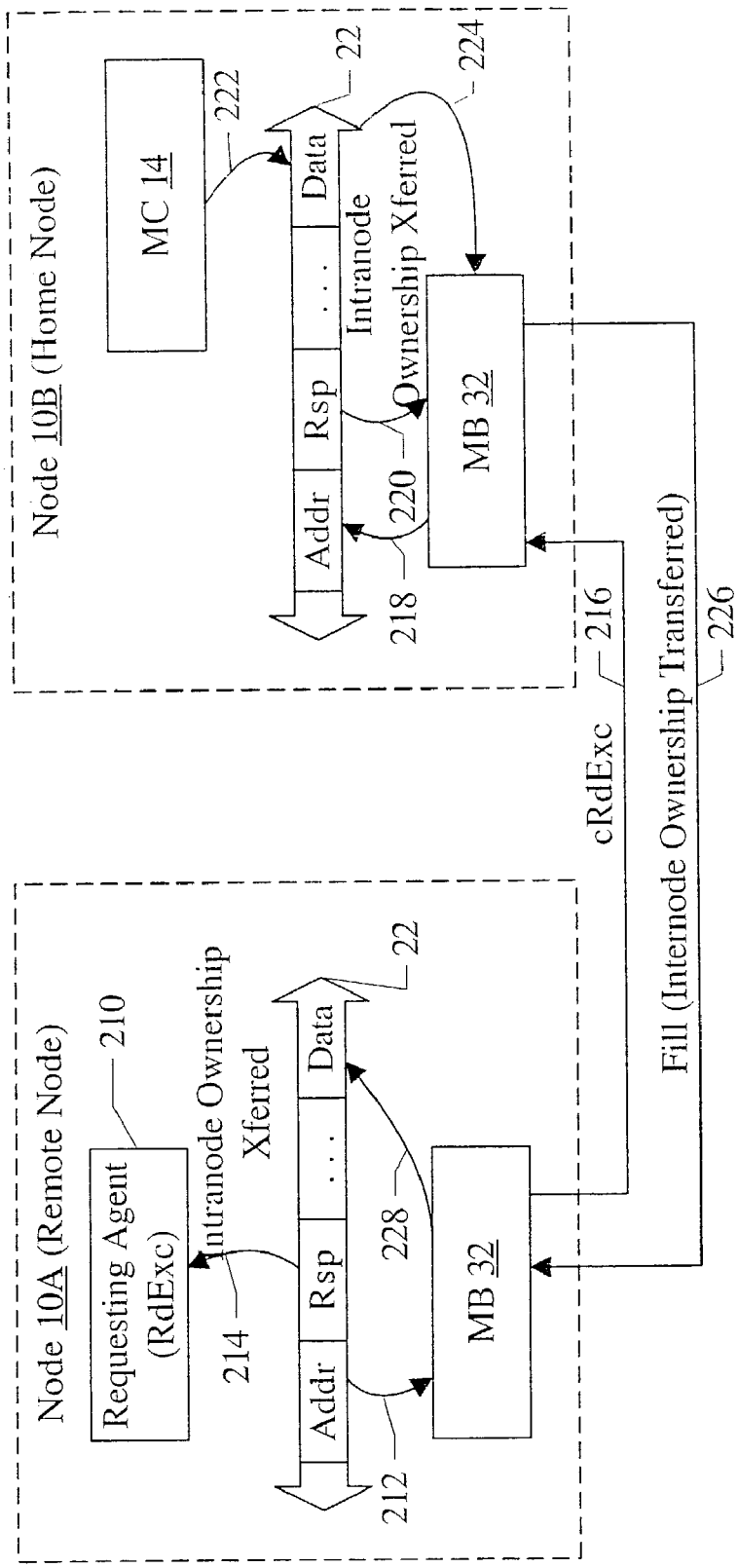
FIG. 9 is a block diagram of one embodiment of two nodes, illustrating ownership transfer for a transaction.

Turning next to FIG. 9, a block diagram of one embodiment of nodes 10A and 10B is shown. The block diagram of FIG. 9 illustrates ownership transfer for an exemplary request (a RdExc by a requesting agent 210) from the home node 10B of the cache block corresponding to the request to the remote node 10A. Each of the nodes 10A and 10B may be instantiations of the node 10.

As mentioned above, transactions on the interconnect 22 in a given node 10 may involve an address phase, a response phase, and a data phase (for read and write transactions). The address phase is transmitted by the initiator of the transaction, and includes the address of the affected cache block, the type of transaction, and other control information. The response phase occurs after the address phase, and indicates the ownership of other agents within the node (and the remote line directory 34 in the home node, as a proxy for other nodes). In one embodiment, the response phase occurs at a predetermined delay from the corresponding address phase. The predetermined delay may be programmable or fixed in various embodiments. In one implementation in which the interconnect 22 is a bus, the predetermined delay may be two clock cycles of the bus clock after the address phase.

In the illustrated embodiment, intranode ownership is transferred during the response phase of the transaction. Thus, in this example, the requesting agent 210 in the node 10A initiates a RdExc transaction to a cache block for which the node 10B is the home node. The requesting agent 210 drives the address phase on the interconnect 22, and the address phase is detected by the memory bridge 32 (and other coherent agents within the remote node 10A) (arrow 212). The response phase occurs, transferring exclusive ownership within the node 10A to the requesting agent 210 (arrow 214). That is, if a subsequent transaction is transmitted on the interconnect 22 in the node 10A, the requesting agent 210 will indicate exclusive ownership. In one embodiment, the requesting agent 210 would be responsible for transmitting the data for the subsequent transaction in this case.

While the requesting agent 210 may have exclusive ownership of the affected cache block in the node 10A, the node 10A may not have ownership of the cache block within the internode coherency scheme. In response to the address phase of the transaction (arrow 212), the memory bridge 32 in the node 10A transmits a cRdExc command to the memory bridge 32 in the node 10B (arrow 216). In response to the cRdExc command, the memory bridge 32 in the node 10B initiates a RdExc transaction on the interconnect 22 in the node 10B (arrow 218). During the response phase of the transaction, intranode ownership is transferred to the memory bridge 32 (arrow 220). The memory controller 14 in the node 10B transfers the data for the RdExc transaction in this example (i.e. the cache block is not exclusively owned elsewhere in this example) (arrow 222), and the memory bridge 32 captures the data (arrow 224). In response to the data, the memory bridge 32 transmits the Fill command with the data to the node 10A (arrow 226). The memory bridge 32 in the node 10A may then transfer the data for the transaction on the interconnect 22 (arrow 228).

As FIG. 9 illustrates, there are two ordering points in the system for a given operation to a remote cache block: the interconnect 22 in a remote node and the interconnect 22 in the home node (e.g. the interconnects 22 in each of the nodes 10A–10B in the example of FIG. 9). While the requesting agent 210 has exclusive ownership of the affected cache block in the node 10A (intranode ownership), the node 10A may not yet have global ownership of the cache block (internode ownership). Internode ownership is dependent on the order of operations at the home node (node 10B in this example). The data transferred to the node 10A in the Fill command reflects the transactions which preceded the RdExc transaction in the node 10B (even if those transactions occurred, in time, subsequent to the RdExc transaction in the node 10A). In other words, the internode ownership may occur in response to the transfer of data in this system. The intranode ownership occurs in the response phase, which is triggered by the address phase. Thus, the intranode ownership transfer occurs in response to the address transfer.

In one embodiment, the interconnect 22 may not support retry. That is, once a transaction is initiated on the interconnect 22, a response phase occurs in a predetermined amount of time and the ownership transfers in that response phase. On retry-capable interconnects, an address transfer may be retried, or canceled (e.g. to permit a modified cache block to be written to memory, or other coherency activity to occur). A retried address transfer is treated, with respect to the interconnect, as if it hasn't occurred yet. Since the address transfer is cancelled, it has no effect on ownership within the node. In such systems, the intranode ownership transfer may be delayed until the internode ownership transfer occurs. However, the present system of transferring internode ownership in response to the internode data transfer permits non-retry-capable interconnects 22 to be used, in some embodiments. Other embodiments may employ retry-capable interconnects, if desired.

Remote Line Directory

Figure 10:
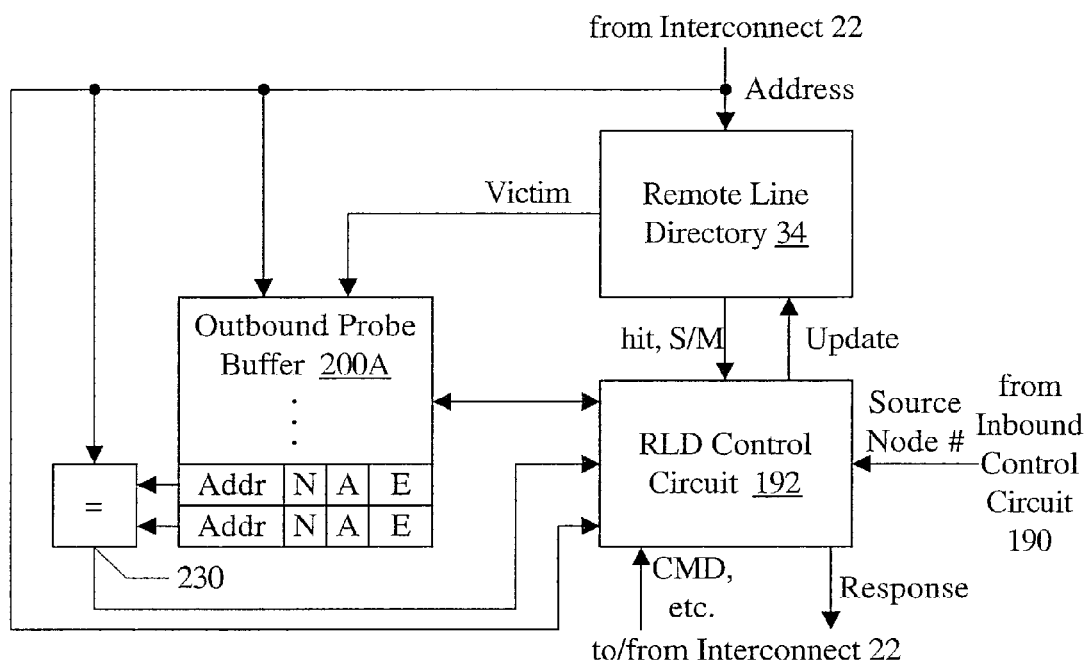
FIG. 10 is a block diagram of one embodiment of a remote line directory and related circuitry.

Turning now to FIG. 10, a block diagram of one embodiment of a portion of the memory bridge 32 is shown. In FIG. 10, the remote line directory 34, the RLD control circuit 192, the outbound probe buffer 200A (part of the outbound command buffers 200 shown in FIG. 8), and compare circuitry 230 are shown. The remote line directory 34, the RLD control circuit 192, the outbound probe buffer 200A, and the compare circuitry 230 are coupled to receive the address (or at least a portion thereof) of a transaction from the interconnect 22. The outbound probe buffer 200A is further coupled to receive victim cache block information from the remote line directory 34. The RLD control circuit 192 is coupled to receive the output of the comparator circuitry 230, command information from the interconnect 22 and optionally other information (e.g. a tag) which indicates the source of the transaction on the interconnect 22, and the source node number of a command which caused a transaction initiated by the inbound control circuit 190. The RLD control circuit 192 is further coupled to receive a hit/miss indication from the remote line directory 34, as well as an indication of the shared/modified status of the cache block in other nodes if a hit is detected. The RLD control circuit 192 may be coupled to provide a response on the interconnect 22 to a transaction (e.g. shared, exclusive, etc.), which may be the response of the memory bridge 32 on the interconnect 22 to the transaction. Additionally, the RLD control circuit 192 may be coupled to provide an update to the remote line directory 34.

The embodiment illustrated in FIG. 10 may be an embodiment in which the remote line directory 34 is capable of tracking the state, in remote nodes, of up to a maximum number of cache blocks, where the maximum number is less than the total number of cache blocks in the portion of the remote coherent space 48 assigned to the node. In another embodiment, the maximum number may be less than the number of entries in remote caches. Since the remote line directory 34 tracks less than the total number of cache blocks, the remote line directory 34 may be smaller than a directory which does track the total number of cache blocks. The remote line directory 34 may be simpler, in some embodiments, to build than a full directory. Also, by occupying less space than a full directory, some embodiments may be more amenable to incorporation into a node that is integrated onto a single integrated circuit.

The remote line directory 34 may have any organization. For example, the remote line directory 34 may have any of the various cache organizations (e.g. set associative, fully associative, or direct-mapped). In one implementation, for example, the remote line directory 34 may have 16 k entries (where each entry stores the remote state of one cache block) arranged in an 8-way set associative configuration. Any replacement algorithm may be used. In one embodiment, for example, a random replacement algorithm may be used. In other embodiments, various least-recently-used (LRU) based algorithms may be used (e.g. LRU, pseudo-LRU, not most recently used, etc.). In some embodiments, an attempt may be made to select an entry which is not currently storing valid state for a cache block. If such all entries are tracking valid state, then an entry is replaced. Other embodiments may not make any attempt to select an entry which is not currently storing valid state.

The remote line directory 34 is relied on for supplying a coherent response on behalf of remote nodes to a transaction on the interconnect 22 for which the node is the home node, and for determining whether or not probes are generated in response to the transaction. Thus, if an entry in the remote line directory 34 is selected in response to a transaction and that entry is storing a valid state of a cache block (referred to as a "victim cache block" since it is being replaced), the memory bridge 32 generates probes to invalidate the victim cache block in the remote nodes which are caching the victim cache block. Additionally, if a remote node has a modified copy of the victim cache block, the probes may cause a WB of the victim cache block to the home node.

Figure 11:
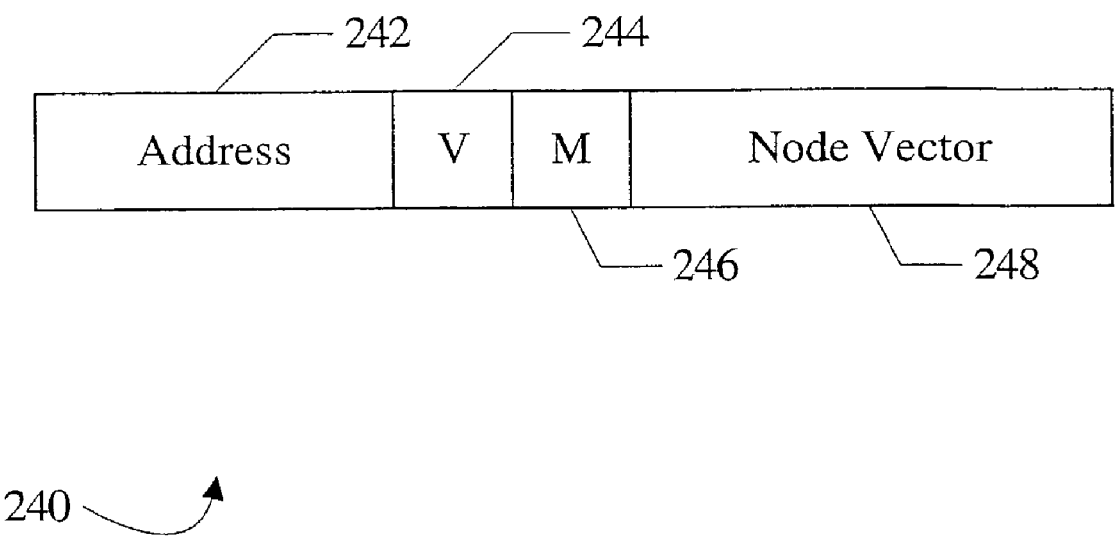
FIG. 11 is a block diagram of one embodiment of a remote line directory entry.

In the embodiment of FIG. 10, the remote line directory 34 receives the address of a transaction and determines if the address is a hit or miss. If the transactions is a miss, the remote line directory provides victim information to the outbound probe buffer 200A. The victim information may include the address of the victim block, an indication of whether or not the block is modified, and an indication of which nodes have a copy of the cache block. The victim information may, in one embodiment, be a copy of the entry selected for replacement. An exemplary entry is shown in FIG. 11. The outgoing probe buffer 200A may allocate an entry for the probe and store the address and node information, and may generate probes to each node to invalidate the copy of the cache blocks in those nodes. The probes may be transmitted to the switch 18 in the same manner as other probes.

If the address is a hit in the remote line directory 34, the remote line directory 34 may indicate the hit to the RLD control circuit 192. Additionally, the remote line directory 34 may supply an indication of whether the block is shared or modified in the remote nodes, and an indication of which node or nodes have copies. The RLD control circuit 192, based on the state reported by the remote line directory 34 and the type of the transaction, may determine whether or not probes are to be generated to one or more remote nodes to provide the ownership requested by the transaction. The RLD control circuit 192 may signal the outbound probe buffer 200A that a probe is to be generated, the type of probe (Flush or Kill), and the node or nodes to which the probe is to be transmitted. The outbound probe buffer 200A is coupled to receive the address of the transaction from the interconnect 22 to use for the probes.

Exemplary probe buffer entries are illustrated in FIG. 10, including at least some of the information that may be stored in the entries. Each entry may include, in this embodiment, the address of the block for which probes have been generated (Addr), the nodes to which the probe is to be transmitted (N), whether or not the probes have been transmitted (not shown), whether or not acknowledgements have been received from each node (A), and an indication of whether or not the probes were generated as a result of an eviction (E). Not shown in FIG. 10 is the communication with the inbound ACK buffer (part of the buffers 198) to detect receipt of acknowledgements, to update the A field.

The eviction indication (E) in each entry is used because the state of the victim cache block in the remote nodes is represented by the probe buffer entry for that victim cache block. That is, the remote line directory 34 has been updated to delete the victim block information. Thus, if a transaction hits on a probe buffer entry for which the eviction indication indicates that the probes are the result of an eviction, the response to the transaction includes the state of the remote blocks as indicated by the eviction indication. For example, if the probe is retrieving a modified block from a remote node, the response from the memory bridge 32 (provided by the RLD control circuit 192) may be exclusive (so that the modified block may be supplied as the data when it is returned from the remote node). By checking for evicted entries in the probe buffer, the correct response may be provided.

The comparator circuit 230 may be coupled to receive the address from the interconnect 22 and may compare the address to addresses in the outbound probe buffer 200A. The comparator circuit 230 may identify hitting entries to the RLD control circuit 290, which may use the results (and the eviction indications) in determining the response to be presented on the interconnect 22.

Additionally, if a transaction on the interconnect 22 causes an entry to be reallocated in the remote line directory 34 after an eviction for which probes remain in the outbound probe buffer 200A, the RLD control circuit 192 may change the eviction indication to no longer indicate eviction. In this manner, the newly created entry in the remote line directory 34 may control responses to subsequent transactions.

The RLD control circuit 192 may generate an update to the remote line directory 34 for each transaction affecting a cache block which is cached by at least one remote node. The RLD control circuit 192 may receive an indication of the source node number of a coherency command which caused the transaction from the inbound control circuit 190. The RLD control circuit 192 may update the entry to indicate that the source node has a copy (shared or modified, depending on the transaction) and may update the entry to delete any nodes to which probes were generated in response to the transaction. In the case of a miss from the remote line directory 34, the RLD control circuit 192 may use the portion of the address that identifies the node number (e.g. the most significant nibble, in one embodiment) to identify transactions for which the node is the home node (and thus the remote line directory may be updated).

FIG. 17 is a table illustrating one embodiment of remote line directory 34 updates in response to transactions on the interconnect 22. The source column in FIG. 17 indicates whether the source is a local coherent agent (e.g. the processors 12A–12N) or a remote agent (via the memory bridge 32). The transaction column in FIG. 17 indicates the transaction (one of the transactions from the table 42). The RLD state column in FIG. 17 indicates the state output by the remote line directory 34 in response to the transaction. The possible states in this embodiment are M (Modified), S (Shared), or I (Invalid, or miss). The New RLD state column in FIG. 17 indicates the state that the RLD control circuit 192 generates for update into the remote line directory 34 in response to the transaction. The Set Owner? column in FIG.

17 indicates whether or not the remote node that caused the transaction is indicated as an owner in the remote line directory 34 (where "_" means don't care). For example, in the embodiment of FIG. 11 described below, the Set Owner? column indicates whether or not the remote node is indicated in the node vector. The Reset Other Owners? column indicates whether or not other owners that may be indicated in the remote line directory 34 are removed. For example, in the embodiment of FIG. 11, the Reset Other Owners? column indicates whether or not other owners are deleted from the node vector.

In addition to the state changes made as illustrated in FIG. 17, the response of the RLD control circuit 194 may be shared (SHD asserted, EXC not asserted) if the RLD state is shared and may be exclusive (SHD not asserted, EXC asserted) if the RLD state is modified. Additionally, the response may be generated based on evictions in the probe buffer 200A, as discussed above.

Turning now to FIG. 11, a block diagram of one embodiment of an entry 240 for one embodiment of the remote line directory 34 is shown. In the embodiment of FIG. 11, the entry 240 includes an address field 242, a valid indication 244, a modified indication 246, and a node vector 248.

The address field 242 includes at least a portion of the address of the cache block, identifying the cache block in the remote coherent space 48. The portion of the address stored in the address field 242 may exclude the address bits which define an offset within the cache block, the address bits which are used as an index into the remote line directory 34 (for set associative or direct-mapped embodiments), and/or the address bits defining the node number. The index bits are implied in the row of the remote line directory 34 that includes the entry, and the node number bits are implied since the remote line directory 34 tracks the remote state of cache blocks for which the node is the home node. Other embodiments may store any of the above mentioned address bits as well, as desired.

The valid indication 244 may indicate whether or not the entry is valid. The valid indication 244 may comprise a bit indicative, when set, that the entry is valid and indicative, when clear, that the entry is invalid. Other embodiments may reverse the set and clear meanings of the bit, or use other indications. The modified indication 246 may indicate whether or not the cache block is modified in a remote node. The modified indication 246 may comprise a bit indicative, when set, that the block is modified and indicative, when clear, that the block is not modified (i.e. it is shared, in one implementation using an MSI internode protocol). Other embodiments may reverse the set and clear meanings of the bit, or use other indications.

The node vector 248 may include an indication for each node, indicating whether or not that node has a copy of the cache block. If the modified indication 246 indicates modified, the node vector 248 may indicate that the modified node has a copy and other nodes do not for the present internode protocol. If the modified indication 246 indicates not modified (shared), the node vector 248 may indicate one or more nodes that have shared copies. In one embodiment, the node vector 248 may include a bit for each node. The bit may be indicative, when set, that the corresponding node has a copy of the cache block and may be indicative, when clear, that the corresponding node does not have a copy of the cache block. Other embodiments may reverse the set and clear meanings of the bit, or use other indications.

Figure 12:
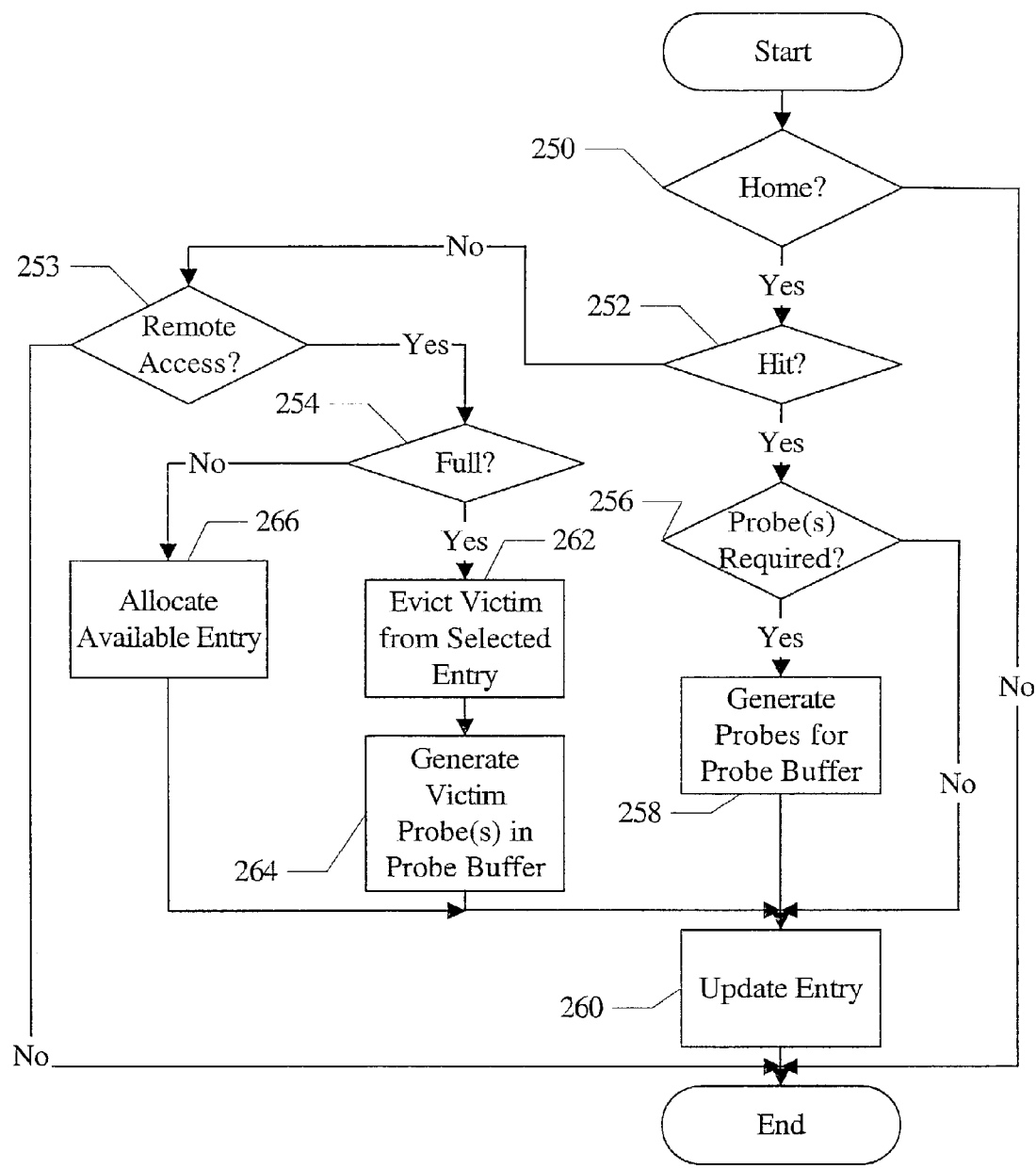
FIG. 12 is a flowchart illustrating certain operations of one embodiment of the RLD control circuit shown in FIG. 10.

Turning now to FIG. 12, a flowchart is shown illustrating operation of one embodiment of the RLD control circuit 192 and the remote line directory 34 in response to a transaction on the interconnect 22. While the blocks shown in FIG. 12 are illustrated in a particular order, other orders may be used. Furthermore, some blocks may be performed in parallel by combinatorial logic circuits in the RLD control circuit 192. For example, decision blocks 250, 252, 253, 254, and 256 may be performed in parallel in some embodiments. Additionally, blocks may be pipelined over one or more clock cycles. For example, the update of the entry may be pipelined from the other operations.

The RLD control circuit 192 may determine if the transaction is an access for which the node 10 is the home (decision block 250). For example, the RLD control circuit 192 may determine if the address of the transaction is in the portion of the remote coherent space 48 assigned to the node 10. The RLD control circuit 192 may compare the node number from the control register 38 to the node number from the transaction address, for example. If the transaction does not access a cache block for which the node 10 is the home node, the RLD control circuit 192/remote line directory 34 may not be involved in the transaction. If the transaction is an access to a cache block for which the node is the home node (decision block 250—yes leg), and the remote line directory 34 is indicating a hit (decision block 252—yes leg), the RLD control circuit 192 may determine if probes are required (decision block 256). Probes may be required, for example, if the transaction takes exclusive ownership of the cache block and there are one or more remote nodes with a copy of the cache block; or if the transaction takes shared ownership of the cache block and there is a modified copy of the cache block in a remote node; or if the transaction invalidates copies of the cache block and there are shared or modified copies of the cache block in remote nodes. If probes are required, the RLD control circuit 192 may provide information for generate the probes for the outbound probe buffer 200A (block 258). In either case, the RLD control circuit 192 may update the hitting entry to reflect the copy of the cache block being transmitted to the remote node, and to delete any remote nodes for which probes were generated (block 260).

If the transaction is an access to a cache block for which the node is the home node, and the remote line directory 34 is indicating a miss (decision block 250—yes leg, and decision block 252—no leg), the RLD control circuit 192 may determine if the transaction is a remote access (decision block 253). That is, the RLD control circuit 192 may determine if the transaction results from a coherency command from a remote node. The RLD control circuit 192 may receive information from the inbound control circuit 190 (e.g. the source node number), the address of the transaction, and/or other transaction information (e.g. the command encoding or a tag indicating the source of the transaction as the memory bridge 32 or another local agent) to make the determination, in various embodiments. If the transaction is not a remote access (decision block 253—no leg), then the remote line directory 34 may not be updated. If the transaction is a remote access (decision block 253—yes leg) and the selected entry is full (that is, currently tracking the state of a cache block in the remote nodes) (decision block 254—yes leg), then the remote line directory 34 may evict the victim cache block from the selected entry (block 262). The remote line directory 34 may provide the state information for the victim cache block to the outbound probe buffer 200A, and the RLD control circuit 192 may signal the outbound probe buffer 200A to allocate an entry for the victim probes (block 264). The RLD control circuit 192 may update the entry with the information for the cache block (address, modified indication, node vector indicating the source node) (block 260). On the other hand, if the selected entry is not full (decision block 254—no leg), the remote line directory 34 may allocate the available entry (block 266). The RLD control circuit 192 may update the entry with the information for the cache block (address, modified indication, node vector indicating the source node) (block 260).

L2 Cache Retaining Node State

The remote line directory 34 tracks the state of home node cache blocks in remote nodes. That is, the internode coherency maintains a state for each node. However, a given node 10 may include multiple coherent agents (e.g. processors 12A–12N, the L2 cache 36, etc.). The coherent agents may include caches storing remote cache blocks in various states. In one embodiment, the node 10 may designate that the node's state for the remote cache block (as recorded in the home node of the remote cache block) be stored in the L2 cache 36. That is, the state of the L2 cache 36 may reflect the state of the remote cache block in the remote node including the L2 cache 36. Other caches may have other states for the cache block (consistent with the state of the L2 cache 36).

By retaining the node state (as recorded in the home node) of the remote cache block in the L2 cache 36, the management of the node state may be simplified. Other coherent agents in the node 10 may not, in some embodiments, treat remote cache blocks any differently than local cache blocks. The coherent agents may coherently allocate and deallocate both local and remote cache blocks within the node 10. The coherent agents may obtain shared copies of a remote cache block within the node 10, even if the node 10 has a modified copy of the cache block in the internode coherency scheme. The coherent agents may modify the remote cache block, and then evict the remote cache block in the same fashion as a local cache block. The local cache block modifications may be captured in the L2 cache 36 and/or the memory controller 14. The remote cache block modifications may be captured by the L2 cache 36.

In one embodiment, the internode coherency scheme may permit the silent dropping of shared remote cache blocks (e.g. the eviction of a shared remote cache block from the remote node without informing the home node). The L2 cache 36 may retain the node state for remote cache blocks that are exclusively held (e.g. the modified state, in the present embodiment) and may allocate shared remote cache blocks when they are transmitted into the node, but may evict a shared remote cache block without ensuring that they are evicted from the node 10 and without informing the home node of the remote cache block. In such embodiments, the L2 cache 36 may be viewed as being inclusive of exclusive (modified) remote cache blocks.

It is noted that, in some embodiments, the L2 cache 36 may be programmable to reserve one or more ways for remote cache blocks (and may use the remaining ways for local cache blocks).

Figure 13:
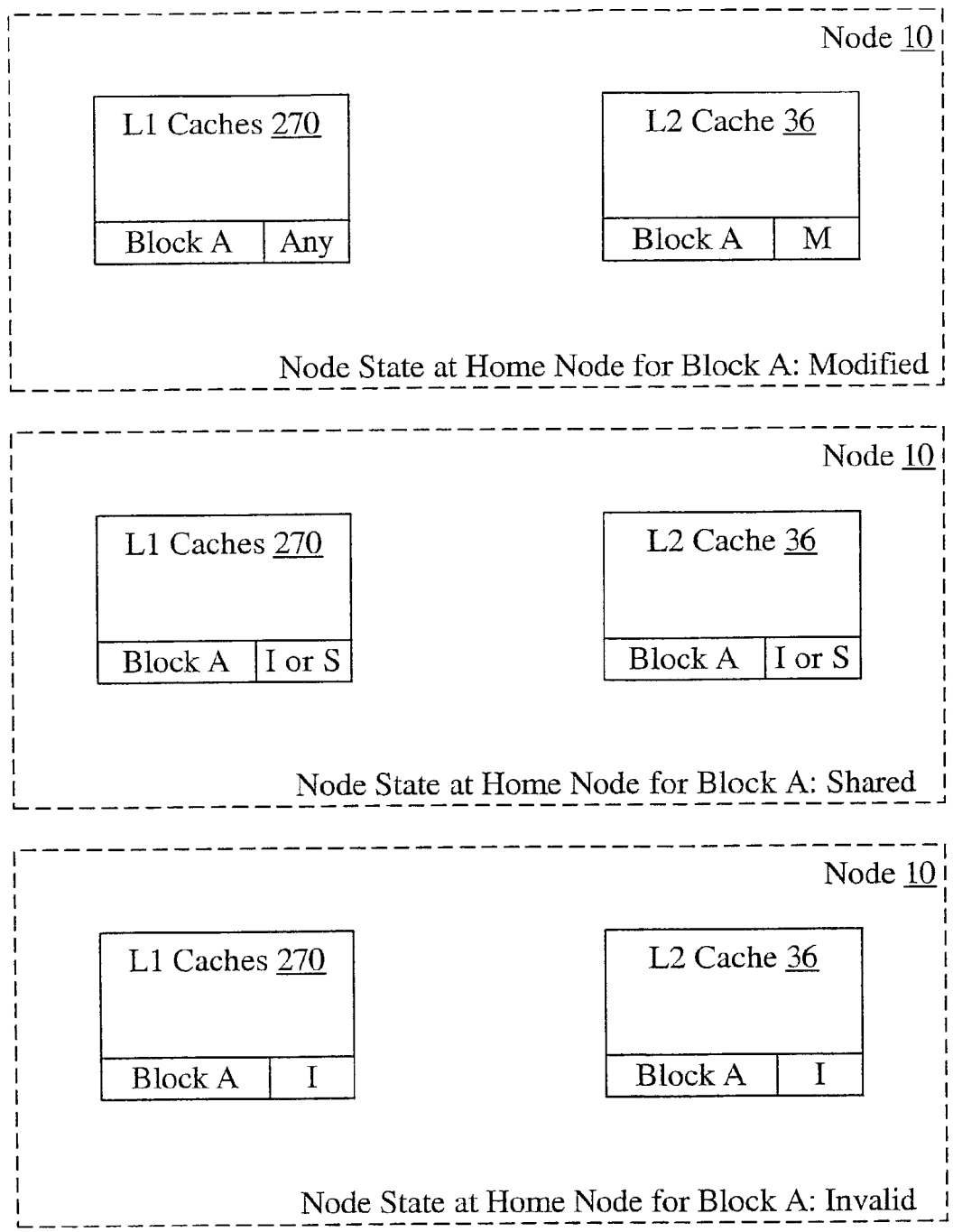
FIG. 13 is a block diagram illustrating exemplary cache states in one embodiment of a node.

Turning now to FIG. 13, a block diagram illustrating the state of a remote cache block in the node 10 for various node states recorded for the node 10 at the home node according to one embodiment is shown.

At the top of FIG. 13, the state of the remote cache block (block A) in the node 10 for a node state of modified recorded in the home node for the node 10 is shown. In this case, the block A is stored in the L2 cache 36 with the modified state (the state of the remote block recorded for the node 10 in the home node). Various other caches (e.g. the L1 caches 270 that may be included in the processors 12A–12N) may have the block A in any state. For example, in embodiments using the MESI coherency protocol for intranode coherency, the state may be any of modified, exclusive, shared, or invalid in any of the various caches 270.

In the middle of FIG. 13, the state of the remote cache block (block A) in the node 10 for a node state of shared recorded in the home node for the node 10 is shown. In this case, the block A may be either shared in the L2 cache 36, or may be invalid. The block A may be allocated into the L2 cache 36 when the block A is fetched from the home node to the node 10, but may be silently dropped at a later time. Similarly, various other caches (e.g. the L1 caches 270) may also have block A in either the shared or the invalid state.

At the bottom of FIG. 13, the state of the remote cache block (block A) in the node 10 for a node state of invalid recorded in the home node for the node 10 is shown. In this case, both the L2 cache 36 and the various other caches 270 have the block A in the invalid state Additionally, both the L2 cache 36 and the various other caches 270 may have the block A in the invalid state if the block A is not recorded in the remote line directory 34 in the home node (for embodiments in which the remote line directory 34 does not track each of the cache blocks for the home node).

It is noted that a cache having the block in the invalid state may refer to the cache location previously storing the block being marked as invalid, as well as to no cache location corresponding to the block. It is further noted that other embodiments may employ other coherency protocols than the MESI protocol for the intranode coherency and the MSI protocol for the internode coherency.

Generally, the various caches 270 in any of the cases shown in FIG. 13 may take a state consistent with the state of the L2 cache 36 for remote cache blocks. A first state may be consistent with a second state if the first state provides no greater access rights to the cache block than the second state provides (where write access is greater than read access, and read access is greater than no access).

Figure 14:
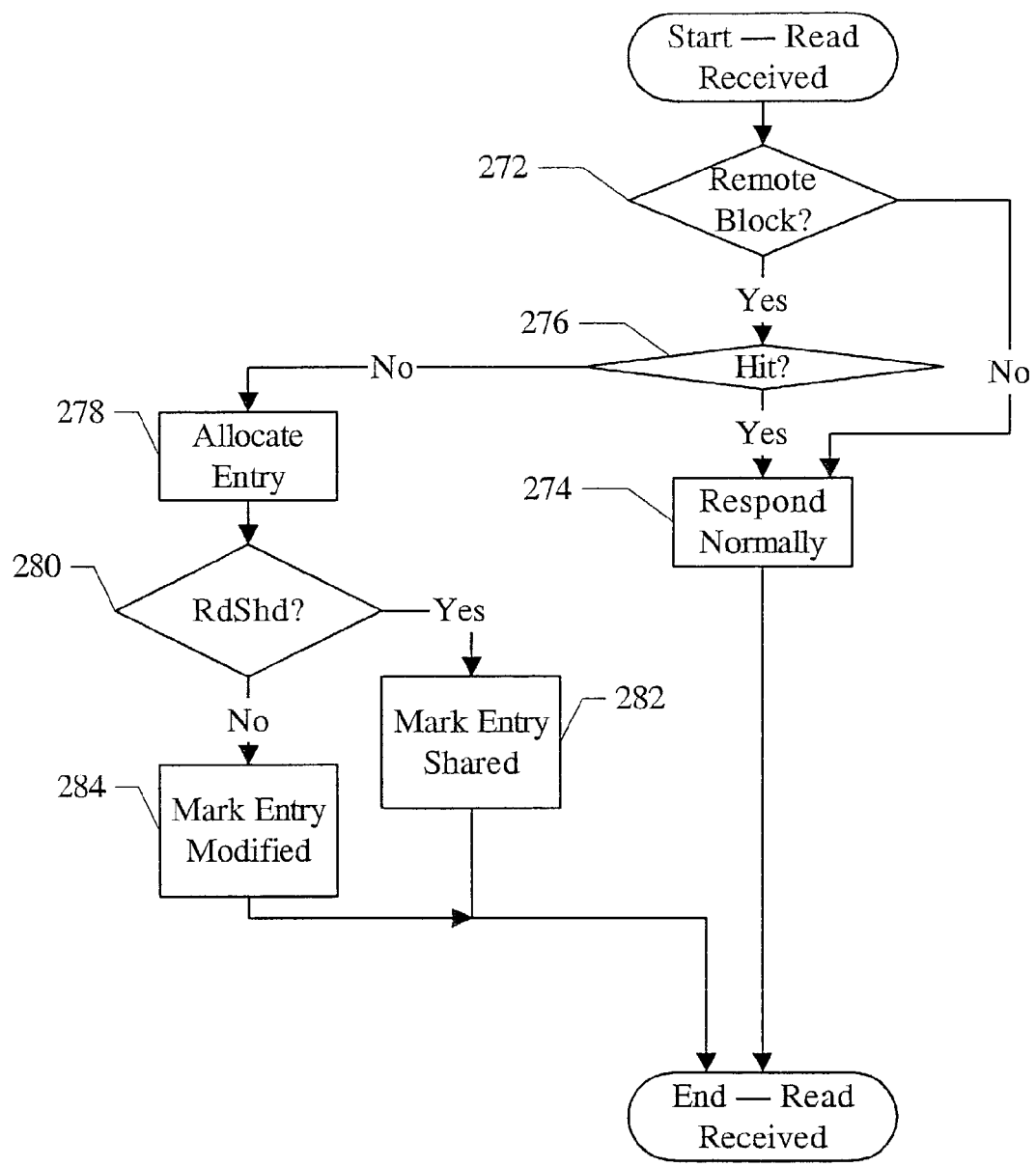
FIG. 14 is a flowchart illustrating certain operations of one embodiment of the L2 cache shown in FIG. 1 in response to a read transaction.

Turning now to FIG. 14, a flowchart is shown illustrating operation of one embodiment of the L2 cache 36 in response to a read transaction on the interconnect 22. In the context of FIG. 14, a read transaction may refer to either a RdExc or RdShd transaction. The RdKill and RdInv transactions may be issued by the memory bridge 32 in response to probes, and the L2 cache 36 may treat them as such (e.g. by invalidating the cache block in the L2 cache 36 and supplying the cache block in the data phase of the RdKill/RdInv transaction if the cache block is modified in the L2 cache 36). The L2 cache 36 may update on a write hit, but may not allocate a location for a remote write in this embodiment. Instead, the write may be transmitted to the home node without caching in the node 10. The blocks shown in FIG. 14 are illustrated in a particular order for ease of understanding, but other orders may be used. Furthermore, blocks may be performed in parallel by combinatorial logic in the L2 cache 36. Other blocks may be pipelined over two or more clock cycles, as desired.

If the read transaction is not to a remote cache block (decision block 272—no leg), the L2 cache 36 may respond to the read transaction normally (supplying data if a hit, optionally allocating a cache block if a miss) (block 274). In one embodiment, the L2 cache 36 may determine if the read transaction is to a remote cache block based on the node number from the configuration register 38 and the most significant nibble of the address of the read transaction. Other embodiments may identify remote cache blocks in other fashions (e.g. different transaction encodings for remote versus local transactions, other control signals, etc.).

If the read transaction is to a remote cache block (decision block 272—yes leg) and is a hit in the L2 cache 36 (decision block 276—yes leg), the L2 cache 36 may also respond normally (block 274). A RdExc transaction may be viewed as a hit if the state in the L2 cache 36 is modified for purposes of decision block 276, since if the state is shared the RdExc transaction may generate a cRdExc command to obtain an exclusive copy of the remote cache block.

If the read transaction is to a remote block (decision block 272—yes leg) and is a miss in the L2 cache 36 (decision block 276—no leg), the L2 cache 36 may allocate a cache entry for the cache block (block 278) (although in the case of the RdExc that hits shared, the existing cache entry may be used). If the read transaction is a RdShd (decision block 280—yes leg), the L2 cache 36 may set the state in the entry to shared (block 282). Otherwise, the read transaction is a RdExc and the L2 cache 36 may set the state in the entry to modified (block 284).

Figure 15:
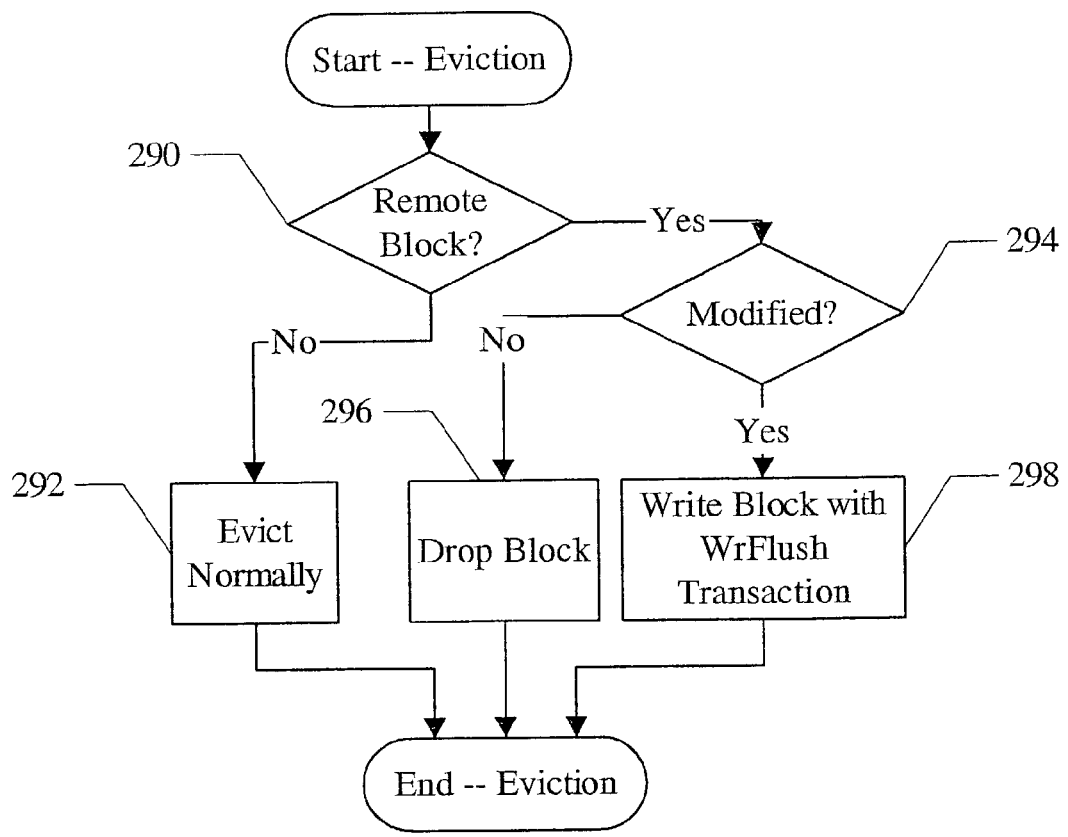
FIG. 15 is a flowchart illustrating certain operations of one embodiment of the L2 cache shown in FIG. 1 during an eviction from the L2 cache.

FIG. 15 is a flowchart illustrating operation of one embodiment of the L2 cache 36 during an eviction of a cache block (e.g. due to allocation of the entry storing the cache block to another cache block). The blocks shown in FIG. 15 are illustrated in a particular order for ease of understanding, but other orders may be used. Furthermore, blocks may be performed in parallel by combinatorial logic in the L2 cache 36. Other blocks may be pipelined over two or more clock cycles, as desired.

If the victim block is not a remote cache block (decision block 290—no leg), the L2 cache 36 may evict the victim block normally (block 292). For example, the L2 cache 36 may generate a Wr transaction to write the victim block to memory 24. Particularly, the L2 cache 36 may not attempt to have the victim block evicted from the various other caches 270. As mentioned above, there may be a number of ways that the L2 cache 36 may determine whether a block is remote or not. For example, the most significant nibble of the address (as compared to the node number in the configuration register 38) may be used. In other embodiments, other mechanisms may be used (e.g. the remote/local status of the cache block may be stored in the L2 cache 36).

If the victim block is a remote cache block (decision block 290—yes leg) and the remote cache block is not in the modified state in the L2 cache 36 (decision block 294—no leg), the L2 cache 36 may drop the block without further action (block 296). If the victim block is a remote cache block (decision block 290—yes leg) and the remote cache block is in the modified state in the L2 cache 36 (decision block 294—yes leg), the L2 cache 36 may generate a WrFlush transaction to write the victim block back to the home node (block 298). The WrFlush transaction may cause a modified owner in the node 10 to supply the data for the WrFlush transaction instead of the L2 cache 36. If there is no other modified owner in the node 10, the L2 cache 36 supplies the data. Thus, if a coherent agent has a more updated copy of the cache block (e.g. in the caches 270), the more updated copy is supplied. If there is no more updated copy, then the L2 cache 36 supplies the cache block.

It is noted that, while the above discussion with regard to FIGS. 1–15 and 17 may have referred to a cache block as the granularity on which coherency is maintained, other embodiments may use different granularities greater than or less than a cache block in size. In such embodiments, a "coherency block" may be treated in the same fashion as a "cache block" or "block" when discussing coherency above. Generally, a "coherency block" may include a set of contiguous (in memory) bytes which are treated as a unit for coherency purposes. In various embodiments, a coherency block may comprise a portion of a cache block, a single cache block, or multiple cache blocks, as desired.

Computer Accessible Medium

Figure 16:
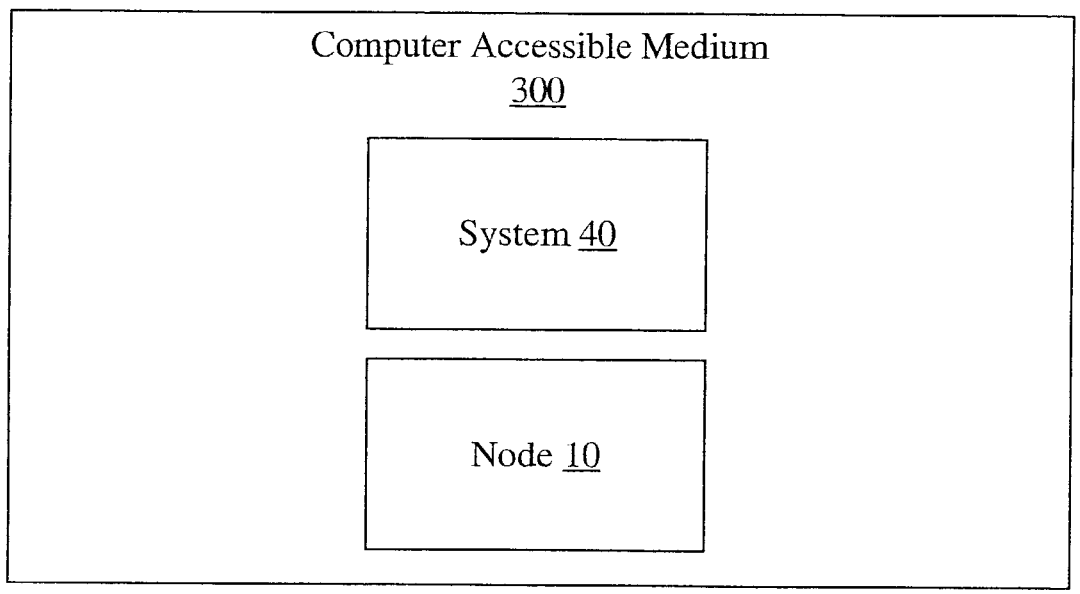
FIG. 16 is a block diagram of a computer accessible medium.

Turning next to FIG. 16, a block diagram of a computer accessible medium 300 including one or more data structures representative of the circuitry included in the node 10 and/or the system 40 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the node 10 and/or the system 40, other embodiments may include a representation of any portion of the node 10 and/or the system 40 (e.g. processors 12A–12N, memory controller 14, L2 cache 36, interconnect 22, memory bridge 32 (or portions thereof), remote line directory 34, switch 18, interface circuits 22A–22C (or portions thereof), nodes 10A–10D (or portions thereof), etc.).

Numerous variations and modifications will become apparent to those skilled in the art once the above disclosure is fully appreciated. It is intended that the following claims be interpreted to embrace all such variations and modifications.

What is claimed is:

1. A system comprising:

a plurality of nodes, in which a first node has one or more coherent agents coupled to a first interconnect, wherein when a coherency block located in the first node is accessed by a transaction on the first interconnect for transmission to a second node that requested the access, ownership for the coherency block in the first node is transferred as an intranode ownership responsive to transmission of an address of the coherency block on the first interconnect; and a second interconnect to which the plurality of nodes are coupled, wherein ownership of the coherency block from the first node to the second node is transferred on the second interconnect as an internode ownership responsive to a data fill command for the coherency block from the first node, and wherein intranode ownership transfer is achieved by address transfer on the first interconnect and internode ownership transfer is achieved by data transfer on the second interconnect to allow use of a non-retry-capable interconnect for the first interconnect.

2. The system as recited in claim 1 wherein the second interconnect comprises a point-to-point data transfer interfaces between the first and second nodes.

3. The system as recited in claim 1 wherein the first node includes a node controller coupled to the first interconnect, and wherein the node controller is configured to generate coherency commands for transmission on the second interconnect responsive to the transaction on the first interconnect.

4. The system as recited in claim 3 wherein, the transaction is a response to a read command from the second node.

5. The system as recited in claim 4 wherein the node controller in the first node is also configured to generate one or more probe commands to change a state in one or more of the plurality of nodes for the coherency block, and wherein the node controller delays transmission of the fill command until the probe commands have been completed.

6. The system as recited in claim 1 wherein the first interconnect includes a response phase at a predetermined delay from the transmission of the address, and wherein intranode ownership is transferred during the response phase.

7. A node comprising
one or more coherent agents coupled to a first interconnect, wherein when a coherency block located in the node is accessed by a transaction on the first interconnect for transmission to another node that requested the access, ownership for the coherency block in the node is transferred as an intranode ownership responsive to transmission of an address of the coherency block on the first interconnect; and
a node controller coupled to the first interconnect and configured to transmit coherency commands on a second interconnect to other nodes, including the another node, wherein ownership of the coherency block from the node to the another node is transferred on the second interconnect as an internode ownership responsive to a data fill command for the coherency block from the node, and wherein intranode ownership transfer is achieved by address transfer on the first interconnect and internode ownership transfer is achieved by data transfer on the second interconnect to allow use of a non-retry-capable interconnect for the first interconnect.

8. The node as recited in claim 7 wherein the second interconnect comprises a point-to-point data transfer interface between the node and the another node.

9. The node as recited in claim 7 wherein, the transaction is a response to a read command from the another node.

10. The node as recited in claim 9 wherein the node controller is also configured to generate one or more probe commands to change a state in one or more other nodes for the coherency block, and wherein the node controller delays transmission of the fill command until the probe commands have been completed.

11. The node as recited in claim 7 wherein the first interconnect includes a response phase at a predetermined delay from the transmission of the address, and wherein intranode ownership is transferred during the response phase.

12. A computer accessible medium comprising one or more data structures representing a node including:
one or more coherent agents coupled to a first interconnect, wherein when a coherency block located in the node is accessed by a transaction on the first interconnect for transmission to another node that requested the access, ownership for the coherency block in the node is transferred as an intranode ownership responsive to transmission of an address of the coherency block on the first interconnect; and
a node controller coupled to the first interconnect and configured to transmit coherency commands on a second interconnect to other nodes, including the another node, wherein ownership of the coherency block from the node to the another node is transferred on the second interconnect as an internode ownership responsive to a data fill command for the coherency block from the node, and wherein intranode ownership transfer is achieved by address transfer on the first interconnect and internode ownership transfer is achieved by data transfer on the second interconnect to allow use of a non-retry-capable interconnect for the first interconnect.

13. The computer accessible medium as recited in claim 12 wherein the second interconnect comprises a point-to-point data transfer interface between the node and the another node.

14. The computer accessible medium as recited in claim 12 wherein the transaction is a response to a read command from the another node.

15. The computer accessible medium as recited in claim 14 wherein the node controller is also configured to generate one or more probe commands to change a state in one or more other nodes for the coherency block, and wherein the node controller delays transmission of the fill command until the probe commands have been completed.

16. The computer accessible medium as recited in claim 12 wherein the first interconnect includes a response phase at a predetermined delay from the transmission of the address, and wherein intranode ownership is transferred during the response phase.

* * * * *

UNITED STATES PATENT AND TRADEMARK OFFICE
CERTIFICATE OF CORRECTION

PATENT NO. : 7,003,631 B2 Page 1 of 1
APPLICATION NO. : 10/270480
DATED : February 21, 2006
INVENTOR(S) : Joseph Rowlands It is certified that error appears in the above-identified patent and that said Letters Patent is hereby corrected as shown below:

Column 31, line 12, in Claim 3: remove the comma after "interconnect"

Signed and Sealed this

Twenty-third Day of December, 2008

JON W. DUDAS
*Director of the United States Patent and Trademark Office*